US008626654B2

(12) United States Patent
Polk

(10) Patent No.: US 8,626,654 B2
(45) Date of Patent: *Jan. 7, 2014

(54) METHOD AND APPARATUS FOR PAYMENT PROCESSING USING DEBIT-BASED ELECTRONIC FUNDS TRANSFER AND DISBURSEMENT PROCESSING USING ADDENDUM-BASED ELECTRONIC DATA INTERCHANGE

(71) Applicant: ACS State & Local Solutions, Inc., Dallas, TX (US)

(72) Inventor: John D. Polk, New Albany, OH (US)

(73) Assignee: ACS State & Local Solutions, Inc., Teaneck, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,019

(22) Filed: Jan. 31, 2013

(65) Prior Publication Data

US 2013/0138560 A1   May 30, 2013

Related U.S. Application Data

(60) Division of application No. 12/841,793, filed on Jul. 22, 2010, now Pat. No. 8,392,326, which is a division of application No. 10/374,968, filed on Feb. 28, 2003, now Pat. No. 7,788,173, which is a continuation of application No. 09/413,862, filed on Oct. 7, 1999, now Pat. No. 7,225,155, which is a continuation of application No. 09/003,941, filed on Jan. 7, 1998, now Pat. No. 6,119,107, which is a division of application No. 08/941,187, filed on Sep. 30, 1997, now Pat. No. 5,946,669.

(51) Int. Cl.
*G06Q 40/00* (2012.01)

(52) U.S. Cl.
USPC .............................................. 705/39; 705/40

(58) Field of Classification Search
USPC ........................................................ 705/39, 40
See application file for complete search history.

(56) References Cited

U.S. PATENT DOCUMENTS

| 4,820,167 A | 4/1989 | Nobles et al. |
| 4,823,264 A | 4/1989 | Deming |
| 5,054,112 A | 10/1991 | Ike |
| 5,220,501 A | 6/1993 | Lawlor et al. |
| 5,231,569 A | 7/1993 | Myatt et al. |

(Continued)

FOREIGN PATENT DOCUMENTS

| WO | WO 97/17678 | 5/1997 |
| WO | WO 99/03243 | 1/1999 |
| WO | WO 00/46732 | 8/2000 |

OTHER PUBLICATIONS

521 Income or Asset Offset, 521B026, May 15, 1997, pp. 1-46.

(Continued)

*Primary Examiner* — Hani M Kazimi
(74) *Attorney, Agent, or Firm* — Finnegan, Henderson, Farabow, Garrett & Dunner, LLP

(57) ABSTRACT

This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

40 Claims, 22 Drawing Sheets

(56) References Cited

U.S. PATENT DOCUMENTS

| | | | |
|---|---|---|---|
| 5,235,507 A | 8/1993 | Sackler et al. | |
| 5,245,368 A | 9/1993 | Farrell et al. | |
| 5,265,007 A | 11/1993 | Barnhard, Jr. et al. | |
| 5,283,829 A | 2/1994 | Anderson | |
| 5,317,732 A | 5/1994 | Gerlach, Jr. et al. | |
| 5,369,699 A | 11/1994 | Page et al. | |
| 5,383,113 A | 1/1995 | Kight et al. | |
| 5,465,206 A | 11/1995 | Hilt et al. | |
| 5,490,243 A | 2/1996 | Millman et al. | |
| 5,576,951 A | 11/1996 | Lockwood | |
| 5,590,360 A | 12/1996 | Edwards | |
| 5,649,117 A | 7/1997 | Landry | |
| 5,652,786 A | 7/1997 | Rogers | |
| 5,666,645 A | 9/1997 | Thomas et al. | |
| 5,699,528 A | 12/1997 | Hogan | |
| 5,704,029 A | 12/1997 | Wright, Jr. | |
| 5,761,647 A | 6/1998 | Boushy | |
| 5,806,842 A | 9/1998 | Steinhilber et al. | |
| 5,878,405 A | 3/1999 | Grant et al. | |
| 5,884,283 A | 3/1999 | Manos | |
| 5,892,900 A | 4/1999 | Ginter et al. | |
| 5,893,080 A | 4/1999 | McGurl et al. | |
| 5,900,801 A | 5/1999 | Heagle et al. | |
| 5,917,965 A | 6/1999 | Cahill et al. | |
| 5,946,669 A | 8/1999 | Polk | |
| 6,034,605 A | 3/2000 | March | |
| 6,052,674 A | 4/2000 | Zervides et al. | |
| 6,070,150 A | 5/2000 | Remington et al. | |
| 6,119,107 A | 9/2000 | Polk | |
| 6,183,140 B1 | 2/2001 | Singer et al. | |
| 6,223,168 B1 | 4/2001 | McGurl et al. | |
| 6,233,428 B1 | 5/2001 | Fryer | |
| 6,270,351 B1 | 8/2001 | Roper | |
| 6,311,170 B1 | 10/2001 | Embrey | |
| 6,347,304 B1 | 2/2002 | Taricani, Jr. | |
| 6,401,079 B1 | 6/2002 | Kahn et al. | |
| 6,567,821 B1 | 5/2003 | Polk | |
| 6,615,190 B1 | 9/2003 | Slater | |
| 7,072,909 B2 | 7/2006 | Polk | |
| 7,165,049 B2 | 1/2007 | Slater | |
| 7,174,315 B2 | 2/2007 | Phillips et al. | |
| 7,225,155 B1 | 5/2007 | Polk | |
| 7,317,823 B1 | 1/2008 | Price et al. | |
| 2002/0032651 A1 | 3/2002 | Embrey | |
| 2002/0038289 A1 | 3/2002 | Lawlor et al. | |
| 2002/0046074 A1 | 4/2002 | Barton | |

OTHER PUBLICATIONS

"1996 ACH Rules", published by National Automated Clearing House Association, Corporate Edition.

ACS State & Local Solutions, Inc.'s Opposition to the Motion to Dismiss of Pay Child Support Online Inc and Daniel J. King, Civil Action No. 02-CV-1321 DWF/SRN, United States District Court for the District of Minnesota, Oct. 7, 2002 (76 pages) (Attachment D).

"ADP PC/Payroll for Windows", published by Automatic Data Processing, Inc. (10 pages), 1997.

Amorette, N. Bryant, Draft of Article for American Payroll Association, *First Hand Experience—Implementing Direct Deposit of Child Support Payments*, undated (6 pages).

"ANSI X12 Standards for EDI," Website at http://www.gap.net/ansix12htm, Jan. 16, 1998.

"Automatic Data Processing Inc."; www.adp.com, printed Mar. 8, 2002, 8 pages.

Basics of EDI, Chapter 3, Website at http://pages.prodigy.com/edibooks/edich31.html (May 30, 1997), David Robert Lambert 1994-96, 2 pages.

Board of Governors of the Federal Reserve System/Washington, D.C., Website at http://www.bog.frb.fed.us/ (May 29, 1997), 10 pages.

Bryant, Amy, *An Employer's View Point on What is Happening with Direct Deposit of Child Support*, NCSEA News, Summer 1997 (3 pages).

Bryant, Amy, Memo to Alicia Key and Cecelia Burke, Office of the Attorney General of Texas, Feb. 27, 1997 (9 pages).

Bryant, Amy, EFT/EDI Deductions for Child Support, City of Houston, Mar. 30, 1997 (65 pages).

"Business Bulletin, A Special Background Report on Trends in Industry and Finance," *Wall Street Journal*, Eastern Edition, Thursday, Jul. 18, 1996, Princeton, New Jersey (1 p.).

Camp, Dave, Letter to James Owen, Meijer, Inc., Jun. 17, 1996 (1 page).

Cason, Katherine L., Electronic Benefits Transfer: New Strategies for Improving Public Assistance Programs, Southern Rural Development Center Information Brief, No. 6, Dec. 1998, located at http://srdc.msstate.edu/publications/brief6.pdf, (6 pages).

Chapman, Irene, Speech for ERICSA (Eastern Region Interstate Child Support Association), New Orleans, Jun. 7, 1994 (13 pages).

Chapman, Irene, Summary of Jun. 8 Teleconference of the AAP ACH Committee, Jun. 10, 1994 (2 pages).

Chapman, Irene, Child Support & Withholding and Price Costco and the Family Perspective, *The Corporate Connection*, May 1996 (4 pages).

"Child Support Agency Doesn't Kid Around with Standardized Form," PaytecH, Mar./Apr. 1998, p. 11.

"Child Support Application Banking Convention: A Guide for Child Support Enforcement Entities & Their Financial Institutions," Bankers EDI Council, (Mar. 28, 1997), (25 pages).

*Child Support Application Banking Convention*, The National Automated Clearing House Association, 1993, Herndon, VA (11 pages).

"Child Support Application Banking Convention: A Guide for Employers & Their Financial Institutions," Bankers EDI Council, 1996 (21 pages).

CMi&s U.S. Electronic Commerce, Website at http://www.creditworthy.com/us/providers/electronic.html (Jun. 6, 1997), 2 pages.

Colorado Child Support Enforcement, Website at http://www.state.co.us/gov_dir/human_services_dir/CSE/cseemp.htm (Jun. 6, 1997), 2 pages.

Complaint for Declaratory Judgment and Patent Infringement, *JPMorgan Chase & Co. et al.* v. *Affiliated Computer Services, Inc. et al.*; (U.S.D.C. Del., Apr. 2008) (33 pages).

Complaint Seeking Declaratory Judgement Under Title 35 of US Code, Civil Action No. 02-CV-1321 DWF/SRN, United States District Court for the District of Minnesota, Jun. 21, 2002 (27 pages) (Attachment A).

Defendant and Counter-Plaintiff ACS State & Local Solutions, Inc.'s Answer and Counterclaim, Civil Action No. 02-CV-1321 DWF/SRN, United States District Court for the District of Minnesota, Jul. 31, 2002 (112 pages) (Attachment B).

Defense Finance and Accounting Service (www.dfas.mil), A Quick Guide to Working with the Military as an Employer, (15 pages).

Defense Finance and Accounting Service (www.dfas.mil), Child Support and Alimony, Apr. 11, 2003 (5 pages).

Defense Finance and Accounting Service (www.dfas.mil), Commercial Debt Garnishment from Federal Civilian Employees, Apr. 11, 2003) (6 pages).

Defense Finance and Accounting Service (www.dfas.mil), Electronic Commerce, Feb. 27, 2003 (4 pages).

Defense Finance and Accounting Service (www.dfas.mil), Garnishment, Apr. 15, 2003 (4 pages).

Defense Finance and Accounting Service (www.dfas.mil), Involuntary Allotment from Military Personnel for Commercial Debt, Apr. 11, 2003 (5 pages).

Direct Payment Market Analysis, Fact Sheet Summary of 1993 PSI Industry Study, dated May 29, 1997 (4 pages).

Direct Payment Marketing Analysis, Website at http://www.nacha.org/marketing/dpma.htm (May 29, 1997), 4 pages.

EC/EDI Fact Sheet, "EC/EDI: The Basics", dated Jun. 6, 1997 (1 page).

EC/EDI: The Basics, Website at http://www.sbaonline.sba.gov/gopher/Ecedi/Info/eced5.txt (Jun. 6, 1997), 1 page.

"EDI Architecture and Document Flow," Website at http://www.acq.osd.mil/ec/edu/edu_03.html, Jan. 16, 1998.

EDI Top Twenty "Questions and Answers about Electronic Data Interchange" pamphlet published by Automated Clearing House Association, no date (6 pages).

(56) References Cited

OTHER PUBLICATIONS

"EFT Child Support"; www.eftchildsupport.com, undated, 45 pages.
Electronic Commerce and Electronic Data Interchange Handbook, Website at http://www.acq.osd.mil/newhandbook/preface/preface. htm, Jan. 16, 1998.
Electronic Commerce Jumpstation, "Electronic Commerce Resource Guide", dated May 30, 1997 (3 pages).
Electronic Commerce Resource Guide, Website at http://www.premenos.com/Resources/Organization (May 30, 1997), 3 pages.
"Electronic Funds Transfer/ Electronic Data Interchange," [Retrieved on Jun. 9, 2002], retrieved from the Internet at http://www.acf.dhhs.gov/programs/cse/pol/dc19328.htm, Jun. 15, 1993 (7 pages).
"Electronic transfer of funds and data [online]," [Retrieved on Jun. 9, 2002], retrieved from the Internet at http://www.acf.dhhs.gov/programs/cse/pol/dc19013.htm, May 24, 1990 (2 pages).
Electronic Funds Transfer Project, Final Report, Washington Statement Department of Social & Health Services, Oct. 1994.
Electronic Funds Transfer, "Cmi&s U.S. Electronic Commerce", Checks by Tel/Fax (EDI, EFT) dated Jun. 6, 1997 (2 pages).
Federal Deposit Insurance Corporation—General Counsel's Opinion No. 8; Stored Value Cards and Other Electronic Payment Systems, 61 Federal Register 150, Aug. 2, 1996, pp. 40490-40494, (6 pages).
Federal Deposit Insurance Corporation—Insurability of Funds Underlying Stored Value Cards and Other Nontraditional Access Mechanisms, 73 Federal Register 220, Nov. 13, 2008, pp. 67155-67157 (3 pages).
Garber, T., "EDI: A weapon in the War Against Delinquent Child Support," Today: The Journal of Work Process Improvement, Oct. 1997, pp. 18-19.
Graham et al., "The Employer Direct Deposit Pilot of the Iowa/Nebraska EFT Project," Colo., Policy Studies Inc., Jun. 1992 (175 pages).
Graham, N.L. & Levy, M.A., "Implementing a Child Support Payment Center," Colorado, Policy Studies Inc., Jan. 1991 (58 pages).
Graham et al.: "The Employer Direct Deposit Pilot of the Iowa/Nebraska EFT Project," Colo., Policy Studies Inc., Jun. 1992, 156 pp. containing printed subject matter.
Hendershott, Amy, (Child Support Enforcement in West Virginia), West Virginia University, Department of Sociology and Anthropology), Dec. 2000, pp. 1-66.
Knudson et al.: "Business-to-business payments and the role of financial electronic data interchange"; Federal Reserve Bulletin, Apr. 1994, vol. 80 No. 4, pp. 269-278.
Pearson, Jessica, Ph.D., Evaluation of Colorado's Credit Bureau Reporting Initiative, Apr. 25, 1997 (29 pages).
Polk, John D., Central Payment Processing: a Sure Bet, NCSEA Conference Notebook, Louisville, Kentucky, Aug. 1996 (4 pages).
Kroener III, William F., Stored Value Cards and Other Electronic Payment Systems, FIL-59-96, Aug. 6, 1996, letter to Chief Executive Officer (1 page).
Lambert, David R., 1994-96 "Basics of EDI", Chapter 3, dated May 30, 1997 (2 pages).
Lang, Scott, letter regarding *Child Support Application Banking Convention: A Guide for Employers & Their Financial Institutions*, Apr. 12, 1996 (4 pages).
Letter by Pat Hagen, OCSE, Apr. 26, 1994 (2 pages).
Letter to DiNuzzo, Joseph A., Insurance Coverage of Deposits for Which Insured Institution Acts as Fiscal Agent for Department of Treasury in Disbursing Social Security and Other Income to Recipients, FDIC-93-35, Jun. 28, 1993, (2 pp.); www.fdic.gov/regulations/laws/rules/4000-8240.html#tail.
"Lockheed Martin IMS & Bottomline Technologies Providing Employers with Electronic System for Garnishing Paychecks of Parents Owing Child Support," Jul. 9, 1996 (3 pp.).
Memorandum Opinion and Order, Civil Action No. 02-CV-1321 DWF/SRN, United States District Court for the District of Minnesota, Dec. 2, 2002 (8 pages) (Attachment E).

Memorandum in Support of Plaintiff and Counter-Defendant's Motion to Dismiss, Civil Action No. 02-CV-1321 DWF/SRN, United States District Court for the District of Minnesota, Sep. 16, 2002 (27 pages) (Attachment C).
National Child Support Enforcement Association, NCSEA News, Summer 1997 Conference Edition, vol. XXVII, No. 3 (4 pages).
National Child Support Enforcement Association, "State Legislatures Address PRWORA's Child Support Requirements," NCSEA News, Summer 1997, vol. 27, No. 3 (44 pages).
NCSEA 45th Conference Notebook, "Putting Children in the Winners Circle," Louisville, Kentucky, Aug. 1996 (434 pages).
"New Hire Reporting", published by Automatic Data Processing, Inc., 1997 (2 pages).
Nickerson, J.M. & Haby, E.M., "EFT Pilot Project Design for Iowa: The Iowa-Nebraska Electronic Funds Transfer Project," (Sep. 1988), (53 pp.).
Nickerson, J.M. & Haby, E.M., "EFT Pilot Project Design for Nebraska: The Iowa-Nebraska Electronic Funds Transfer Project," (Sep. 1988), (40 pp.).
Office of Child Support Enforcement web page, Dec. 20, 1994 (12 pages).
Oracle EDI Gateway, User's Guide, ORACLE®, Release 11, Mar. 1998 (246 pages).
Oracle Human Resources, North American User's Guide, ORACLE®, Release 11, vol. 1, Mar. 1998 (908 pages).
Oracle Payroll, User's Guide, ORACLE®, Release 11, vol. 1, Mar. 1998 (934 pages).
"Pay Child Support Online"; www.paychildsupportonline.com, printed Mar. 8, 2002, 10 pages.
Polk, John D., Centralized Collection/Disbursement, NCSEA Conference Notebook, Aug. 1997 (18 pages).
*Program Eases Child Support Payments for Colorado*, Aug. 15, 1996 (1 page).
Public Law 104-193, 110 STAT. 2105, 104th Congress, Aug. 22, 1996 (251 pages).
Public Law 100-485, 102 STAT. 2343, 100th Congress, Oct. 13, 1988 (87 pages).
Screen prints from City of Houston Payroll System, Jan. 23, 1996 (14 pages).
"SIDAC, Spring 1997 Newsletter," Website at http://www.sidac.wpafb.af.mil/newsletter/spr97.html, Jan. 16, 1998.
"Standards Governing EC/EDI," Chapter 6, Website at http://net.gap.net/ch6.htm, Jan. 16, 1998.
"Standing Tall for Children", Conference Notebook, NCSEA 46*th* Annual Conference & Exposition, Phoenix, Arizona, Aug. 1997 (453 pages).
Summary of Apr. 14 APA ACH Committee, Apr. 19, 1994 (22 pages).
*The Guide to Successful Direct Deposit*, 13*th* Ed., American Payroll Association, Mar. 1, 2000 (301 pages).
The National Automated Clearing House Association, Website at http://www.nacha.org/nacha/nacha.htm (May 29, 1997), 2 pages.
U.S. District Court, District of Minnesota Civ. Action No. 02-CV-1321 DWF/SRN: *Pay Child Support Online Inc. v. ACS State & Local Solutions, Inc.*, Memorandum in Support of Plaintiff and Counter-Defendant's Motion to Dismiss, 26 pages, Sep. 16, 2002 (Exhibit A).
U.S. District Court, District of Minnesota Civ. Action No. 02-CV-1321 DWF/SRN: *Pay Child Support Online Inc. v. ACS State & Local Solutions, Inc.*, ACS State & Local Solutions, Inc.'s Opposition to the Motion to Dismiss of Pay Child Support Online Inc and Daniel J. King, 28 pages, Oct. 7, 2002 (Exhibit B).
U.S. District Court, District of Minnesota Civ. Action No. 02-CV-1321 DWF/SRN: *Pay Child Support Online Inc. v. ACS State & Local Solutions, Inc.*, Memorandum Opinion and Order, 8 pages, Dec. 2, 2002 (Exhibit C).
U.S. District Court, District of Minnesota Civ. Action No. 02-CV-1321 DWF/SRN: *Pay Child Support Online Inc. v. ACS State & Local Solutions, Inc.*, ACS's Memorandum of Law in Support of Its Motion for Summary Judgment of Validity and Literal Infringement, 29 pages, Sep. 16, 2003 (Exhibit A).
U.S. District Court, District of Minnesota Civ. Action No. 02-CV-1321 DWF/JSM: *Pay Child Support Online Inc. v. ACS State & Local*

(56) References Cited

OTHER PUBLICATIONS

*Solutions, Inc.*, PCSO, PSI and Hill's Memorandum of Law Opposing Motion for Summary Judgment, 31 pages, Oct. 21, 2003 (Exhibit B).

U.S. District Court, District of Minnesota Civ. Action No. 02-CV-1321 DWF/JSM: *Pay Child Support Online Inc.* v. *ACS State & Local Solutions, Inc.*, ACS's Reply Memorandum in Support of Its Motion for Summary Judgment of Validity and Literal Infringement, 22 pages, Oct. 28, 2003 (Exhibit C).

U.S. District Court, District of Minnesota Civ. Action No. 02-CV-1321 DWF/JSM: *Pay Child Support Online Inc.* v. *ACS State & Local Solutions, Inc.*, Order, 2 pages, Dec. 12, 2003 (Exhibit D).

U.S. District Court, District of Minnesota Civ. Action No. 02-CV-1321 DWF/JSM: *Pay Child Support Online Inc.* v. *ACS State & Local Solutions, Inc.*, ACS's Supplemental Brief on Obviousness in Support of ACS' Motion for Summary Judgment, 14 pages, Jan. 12, 2004 (Exhibit E).

U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Brief Regarding Obviousness, 10 pages, Jan. 12, 2004 (Exhibit F).

U.S. District Court, District of Minnesota Civ. Action No. 02-CV-1321 DWF/JSM: *Pay Child Support Online Inc.* v. *ACS State & Local Solutions, Inc.*, ACS's Response to the New Issues Raised in PCSO's Supplemental Brief on Obviousness, 8 pages, Jan. 23, 2004 (Exhibit G).

U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Response to New Issued Raised by ACS, 3 pages, Jan. 29, 2004 (Exhibit H).

U.S. District Court, District of Minnesota Civ. Action No. 02-CV-1321 DWF/JSM: *Pay Child Support Online Inc.* v. *ACS State & Local Solutions, Inc.*, Memorandum Opinion and Order, 22 pages, Apr. 5, 2004 (Exhibit I).

U.S. District Court, District of Minnesota Civ. Action No. 02-CV-1321 DWF/JSM: *Pay Child Support Online Inc.* v. *ACS State & Local Solutions, Inc.*, Joint Motion for Entry of Order of Judgment, 6 pages, Jul. 22, 2004 (Exhibit J).

U.S. District Court, District of Minnesota Civ. Action No. 02-CV-1321 DWF/JSM: *Pay Child Support Online Inc.* v. *ACS State & Local Solutions, Inc.*, Order of Judgment, 3 pages, Jul. 28, 2004 (Exhibit K).

U.S. District Court, District of Minnesota Civ. Action No. 02-CV-1321 DWF/JSM: *Pay Child Support Online Inc.* v. *ACS State & Local Solutions, Inc.*, Judgment in a Civil Case, 2 pages, Jul. 29, 2004 (Exhibit L).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Complaint for Declaratory Judgment and Patent Infringement, Dec. 10, 2008 (44 pages) (Exhibit 2).

U.S. District Court of Delaware Civil Action No. 08cv00189-SLR; *JPMorgan Chase & Co., et al.* v. *Affiliated Computer Services, Inc., et al.*—[Proposed] Order and Rule 7.1.1 Statement, Dec. 10, 2008 (5 pages), (Exhibit 3).

U.S. District Court of Delaware Civil Action No. 08cv00189-SLR; *JPMorgan Chase & Co., et al.* v. *Affiliated Computer Services, Inc., et al.*—Defendant ACS's Opening Brief in Support of Motion for Leave to File First Amended Answer and Counterclaims, Dec. 10, 2008 (12 pages).

U.S. District Court of Delaware Civil Action No. 08cv00189-SLR; *JPMorgan Chase & Co., et al.* v. *Affiliated Computer Services, Inc., et al.*—Plaintiff JPMorgan's Answering Brief in Opposition to Defendant ACS's Motion for Leave to File a First Amended Answer and Counterclaims, Jan. 9, 2009 (37 pages).

U.S. District Court of Delaware Civil Action No. 08cv00189-SLR; *JPMorgan Chase & Co., et al.* v. *Affiliated Computer Services, Inc., et al.*—Declaration of Stephen T. Schreiner, Esq., in Support of Plaintiff JPMorgan's Answering Brief in Opposition to Defendant ACS's Motion for Leave to File a First Amended Answer and Counterclaims, Jan. 9, 2009 (4 pages).

U.S. District Court of Delaware Civil Action No. 08cv00189-SLR; *JPMorgan Chase & Co., et al.* v. *Affiliated Computer Services, Inc., et al.*—Direct Express® Debit MasterCard®, Financial Management Service, www.fms.treas.gov/directexpresscard/index.html, Nov. 12, 2008, filed Jan. 9, 2009 (3 pages) (Exhibit A).

U.S. District Court of Delaware Civil Action No. 08cv00189-SLR; *JPMorgan Chase & Co., et al.* v. *Affiliated Computer Services, Inc., et al.*—Treasury Announces Direct Express® Debit Card for SSA and SSI Recipients, Financial Management Service, www.fms.treas.gov/afc/jan_article3.html, Feb. 21, 2008, filed Jan. 9, 2009 (3 pages) (Exhibit B).

U.S. District Court of Delaware Civil Action No. 08cv00189-SLR; *JPMorgan Chase & Co., et al.* v. *Affiliated Computer Services, Inc., et al.*—Direct Express®, Debit Card Services for Federal Benefit Recipients, Financial Agency Agreement Between the Financial Management Service U.S. Department of the Treasury and Comerica Bank, Effective Date: Jan. 3, 2008 (44 pages) (Exhibit C).

U.S. District Court of Delaware Civil Action No. 08cv00189-SLR; *JPMorgan Chase & Co., et al.* v. *Affiliated Computer Services, Inc., et al.*—eVerge Group—www.eVergeGroup.com—"eVerge Group Case Study—Affiliated Computer Services," Jan. 9, 2009 (2 pages) (Exhibit D).

U.S. District Court of Delaware Civil Action No. 08cv00189-SLR; *JPMorgan Chase & Co., et al.* v. *Affiliated Computer Services, Inc., et al.*—Supplemental Information Disclosure Statement and Substitute for Form 1449A PTO, (Dec. 30, 2004), filed Jan. 9, 2009 (14 pages) (Exhibit E).

U.S. District Court of Delaware Civil Action No. 08cv00189-SLR; *JPMorgan Chase & Co., et al.* v. *Affiliated Computer Services, Inc., et al.*—Electronic Information Disclosure Statement, Jan. 9, 2009 (3 pages) (Exhibit F).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Set of Requests for Production, Jul. 16, 2008 (48 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Amended Set of Requests for Production, Nov. 24, 2008 (46 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Second Set of Requests for Production, Nov. 24, 2008 (55 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Third Set of Requests for Production, Jan. 9, 2009 (18 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Set of Interrogatories, Aug. 4, 2008 (30 pages).

U.S. District Court of Delaware Civil Action No. 08cv00189-SLR; *JPMorgan Chase & Co., et al.* v. *Affiliated Computer Services, Inc., et al.*—Plaintiffs' Supplemental Objections and Responses to Defendants' Amended First Set of Interrogatories, Nov. 3, 2008 (24 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Second Set of Interrogatories, Sep. 15, 2008 (19 pages).

U.S. District Court of Delaware Civil Action No. 08cv00189-SLR; *JPMorgan Chase & Co., et al.* v. *Affiliated Computer Services, Inc., et al.*—Plaintiffs' Supplemental Objections and Responses to Defendants' Amended Second Set of Interrogatories, Nov. 3, 2008 (17 pages).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Third Set of Interrogatories, Nov. 24, 2008 (17 pages).

U.S. District Court of Delaware Civil Action No. 08cv00189-SLR; *JPMorgan Chase & Co., et al.* v. *Affiliated Computer Services, Inc.,*

(56) References Cited

OTHER PUBLICATIONS et al.—Plaintiffs' Initial Disclosures Pursuant to Fed. R. Civ. P. 26(a)(1), Aug. 1, 2008 (15 pages).
U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' First Set of Requests for Production of Documents to Defendants Affiliated Computer Services, Inc. and ACS State & Local Solutions Inc., Jul. 17, 2008 (77 pages).
U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' Second Set of Requests for Production of Documents to Defendants Affiliated Computer Services, Inc. and ACS State & Local Solutions Inc., Nov. 7, 2008 (74 pages).
U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' First Set of Interrogatories to Defendants Affiliated Computer Services, Inc. and ACS State & Local Solutions, Inc., Jul. 17, 2008 (37 pages).
U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' First Amended and Consolidated Set of Interrogatories to Defendants Affiliated Computer Services, Inc. and ACS State & Local Solutions, Inc., Nov. 7, 2008 (36 pages).
U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' Second Set of Interrogatories to Defendants Affiliated Computer Services, Inc. and ACS State & Local Solutions, Inc., Nov. 7, 2008 (17 pages).
U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s Initial Disclosures, Aug. 1, 2008 (17 pages).
U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s First Supplemental Initial Disclosures, Jan. 12, 2009 (14 pages).
U.S. District Court of Delaware Civil Action No. 08cv00189-SLR; *JPMorgan Chase & Co., et al.* v. *Affiliated Computer Services, Inc., et al.*—Defendant ACS's Objections and Response to Plaintiffs' Third Set of Requests for Production of Documents to Defendants Affiliated Computer Services Inc. and ACS State & Local Solutions Inc., Mar. 9, 2009 (52 pages).
U.S. District Court of Delaware Civil Action No. 08cv00189-SLR; *JPMorgan Chase & Co., et al.* v. *Affiliated Computer Services, Inc., et al.*—Defendants Affiliated Computer Services, Inc., and ACS State & Local Solutions, Inc.'s Objections and Responses to Plaintiffs' Third Set of Interrogatories (Nos. 27-40), Apr. 29, 2009 (44 pages).
U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s Second Supplemental Initial Disclosures, Apr. 21, 2009 (13 pages).
U.S. District Court of Delaware Civil Action No. 08cv00189-SLR; *JPMorgan Chase & Co., et al.* v. *Affiliated Computer Services, Inc., et al.*—Plaintiffs' Fourth Supplemental Objections and Responses to Defendants' Amended First Set of Interrogatories (Nos. 1-6), Apr. 24, 2009 (21 pages).
U.S. District Court of Delaware Civil Action No. 08cv00189-SLR; *JPMorgan Chase & Co., et al.* v. *Affiliated Computer Services, Inc., et al.*—Answer to ACS's First Amended Counterclaims, Mar. 18, 2009 (16 pages).
U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), Apr. 3, 2009 (46 pages).
U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), Apr. 3, 2009 (49 pages).
U.S. District Court of Delaware Civil Action No. 08cv00189-SLR; *JPMorgan Chase & Co., et al.* v. *Affiliated Computer Services, Inc., et al.*—Second Amended and Supplemental Complaint for Declaratory Judgment and Patent Infringement, Apr. 2, 2009 (45 pages).
U.S. District Court of Delaware Civil Action No. 08cv00189-SLR; *JPMorgan Chase & Co., et al.* v. *Affiliated Computer Services, Inc., et al.*—Exhibits to Second Amended and Supplemental Complaint for Declaratory Judgment and Patent Infringement (vol. 3—Exhibits O-W, Apr. 2, 2009 (2 pages).
U.S. District Court of Delaware Civil Action No. 08cv00189-SLR; *JPMorgan Chase & Co., et al.* v. *Affiliated Computer Services, Inc., et al.*—Harry W. Wiggins, Prepared Statement of Harry W. Wiggins, Vice President, Child Support Services, Lockheed Martin IMS Children and Family Services Before the House Government Reform and Oversight Committee Human Resources Subcommittee—"Social Service Privatization: The Benefits and Challenges to Child Support Enforcement Programs", Federal Information Systems Corporation Federal News Service, Section: In the News, Nov. 4, 1997 (8 pages) (Exhibit P).
U.S. District Court of Delaware Civil Action No. 08cv00189-SLR; *JPMorgan Chase & Co., et al.* v. *Affiliated Computer Services, Inc., et al.*—Steven Marjanovic, Bottomline Taps Lockheed to Market Software That Deducts Child Support, American Banker, Inc., The American Banker, Section: Technology/Operations; p. 15, Jul. 12, 1996 (2 pages) (Exhibit Q).
U.S. District Court of Delaware Civil Action No. 08cv00189-SLR; *JPMorgan Chase & Co., et al.* v. *Affiliated Computer Services, Inc., et al.*—PMR news briefs, IOMA Payroll Manager's Report, Section: p. 13, Sep. 4, 1997 (3 pages) (Exhibit R).
U.S. District Court of Delaware Civil Action No. 08cv00189-SLR; *JPMorgan Chase & Co., et al.* v. *Affiliated Computer Services, Inc., et al.*—States, Counties Automate Child Support Processing, 2008 Factiva, Inc., Aug. 1, 1996 (3 pages) (Exhibit S).
U.S. District Court of Delaware Civil Action No. 08cv00189-SLR; *JPMorgan Chase & Co., et al.* v. *Affiliated Computer Services, Inc., et al.*—Metropolitan Digest/Los Angeles County News in Brief: Los Angeles County; New Computer Keeps Track of Child Support Payments, The Times Mirror Company; Los Angeles Times, Section: Metro; Part B; p. 2; Metro Desk, Mar. 9, 1995 (2 pages) (Exhibit T).
U.S. District Court of Delaware Civil Action No. 08cv00189-SLR; *JPMorgan Chase & Co., et al.* v. *Affiliated Computer Services, Inc., et al.*—Carla Rivera, Electronic Child Support System Unveiled; Government Critics Say New Computer System Is Plagued With Problems and May Be Inadequate. A Few Bugs Just Need to Be Worked Out, District Attorney Responds, The Times Mirror Company; Los Angeles Times, Section: Metro; Part B; p. 1; Metro Desk, Mar. 10, 1995 (3 pages) (Exhibit U).
U.S. District Court of Delaware Civil Action No. 08cv00189-SLR; *JPMorgan Chase & Co., et al.* v. *Affiliated Computer Services, Inc., et al.*—Dan Morain, State to Stay With Child-Support Computer Setup; Technology: Tracking System Is Incomplete and Consultant Lists 1,400 Problems, But Official Defends Project, Times Mirror Company; Los Angeles Times, Section: Part A; p. 3; Metro Desk, May 2, 1997 (3 pages) (Exhibit V).
U.S. District Court of Delaware Civil Action No. 08cv00189-SLR; *JPMorgan Chase & Co., et al.* v. *Affiliated Computer Services, Inc., et al.*—Lockheed Martin IMS Retains Landmark Child Support Payment processing Contract in Los Angeles County; * Awarded three-year, $24 million contract * Processes more than $350 million annually for Los Angeles County * Is nation's oldest, privatized child support payment processing operation, PR Newswire Association, Inc., PR Newswire, Section: State and Regional News, Dec. 4, 2000 (3 pages) (Exhibit W).

(56) References Cited

OTHER PUBLICATIONS

U.S. District Court of Delaware Civil Action No. 08cv00189-SLR; *JPMorgan Chase & Co., et al. v. Affiliated Computer Services, Inc., et al.*—Attachment A1, U.S. Patent No. 7,317,823 Claim Chart (ACS's Identification of Prior Art, '823 Patent), (23 pages).
U.S. District Court of Delaware Civil Action No. 08cv00189-SLR; *JPMorgan Chase & Co., et al. v. Affiliated Computer Services, Inc., et al.*—Attachment A2, U.S. Patent No. 5,917,965 Claim Chart (ACS's Identification of Prior Art, '965 Patent), (60 pages).
U.S. District Court of Delaware Civil Action No. 08cv00189-SLR; *JPMorgan Chase & Co., et al. v. Affiliated Computer Services, Inc., et al.*—Attachment A3, Access Card '190 (51 pages).
U.S. District Court of Delaware Civil Action No. 08cv00189-SLR; *JPMorgan Chase & Co., et al. v. Affiliated Computer Services, Inc., et al.*—Attachment A4, Access Card '049 (36 pages).
U.S. District Court of Delaware Civil Action No. 08cv00189-SLR; *JPMorgan Chase & Co., et al. v. Affiliated Computer Services, Inc., et al.*—Attachment A5, Access Card '315 (36 pages).
U.S. District Court of Delaware Civil Action No. 08cv00189-SLR; *JPMorgan Chase & Co., et al. v. Affiliated Computer Services, Inc., et al.*—Attachment A6,DPC '190 (58 pages).
U.S. District Court of Delaware Civil Action No. 08cv00189-SLR; *JPMorgan Chase & Co., et al. v. Affiliated Computer Services, Inc., et al.*—Attachment A7,DPC '049 (39 pages).
U.S. District Court of Delaware Civil Action No. 08cv00189-SLR; *JPMorgan Chase & Co., et al. v. Affiliated Computer Services, Inc., et al.*—Attachment A8,DPC '315 (33 pages).
U.S. District Court of Delaware Civil Action No. 08cv00189-SLR; *JPMorgan Chase & Co., et al. v. Affiliated Computer Services, Inc., et al.*—Attachment A9,SAS '190 (68 pages).
U.S. District Court of Delaware Civil Action No. 08cv00189-SLR; *JPMorgan Chase & Co., et al. v. Affiliated Computer Services, Inc., et al.*—Attachment A10,SAS '049 (43 pages).
U.S. District Court of Delaware Civil Action No. 08cv00189-UNA; *JPMorgan Chase & Co., et al. v. Affiliated Computer Services, Inc., et al.*—Jeffrey Norwine's Objections and Responses to Defendant's Second amended Notice of Rule 30(b)(1) Deposition and Subpoena Duces Tecum of Jeffrey Norwine, dated Jun. 16, 2009 (13 pages).
U.S. District Court of Delaware Civil Action No. 08cv00189-UNA; *JPMorgan Chase & Co., et al. v. Affiliated Computer Services, Inc., et al.*—Penny Joines's Objections and Responses to Defendant's Second amended Notice of Rule 30(b)(1) Deposition and Subpoena Duces Tecum of Penny Joines, dated Jun. 16, 2009 (13 pages).
U.S. District Court of Delaware Civil Action No. 08cv00189-UNA; *JPMorgan Chase & Co., et al. v. Affiliated Computer Services, Inc., et al.*—Gregory Phillips's Objections and Responses to Defendant's Second amended Notice of Rule 30(b)(1) Deposition and Subpoena Duces Tecum of Gregory Phillips, dated Jun. 16, 2009 (13 pages).
U.S. District Court of Delaware Civil Action No. 08cv00189-UNA; *JPMorgan Chase & Co., et al. v. Affiliated Computer Services, Inc., et al.*—Rebecca Deporte's Objections and Responses to Defendant's Second amended Notice of Rule 30(b)(1) Deposition and Subpoena Duces Tecum of Rebecca Deporte, dated Jun. 16, 2009 (13 pages).
U.S. District Court of Delaware Civil Action No. 08cv00189-UNA; *JPMorgan Chase & Co., et al. v. Affiliated Computer Services, Inc., et al.*—ACS's Objections and Responses to Plaintiff's Notice to Take Deposition of Affiliated Computer Services, Inc. and ACS State and Local Solutions, Inc., dated May 26, 2009 (36 pages).
U.S. District Court of Delaware Civil Action No. 08cv00189-UNA; *JPMorgan Chase & Co., et al. v. Affiliated Computer Services, Inc., et al.*—Stephen T. Schreiner's Objections and Responses to Defendant's Notice of Rule 30(b)(1) Deposition and Subpoena Duces Tecum of Stephen T. Schreiner, dated May 26, 2009 (7 pages).
U.S. District Court of Delaware Civil Action No. 08cv00189-UNA; *JPMorgan Chase & Co., et al. v. Affiliated Computer Services, Inc., et al.*—Thomas Bradshaw's Objections and Responses to Defendant's Notice of Rule 30(b)(1) Deposition and Subpoena Duces Tecum of Thomas Bradshaw, dated May 26, 2009 (7 pages).
U.S. District Court of Delaware Civil Action No. 08cv00189-UNA; *JPMorgan Chase & Co., et al. v. Affiliated Computer Services, Inc., et al.*—Kim Slater's Objections and Responses to Defendant's Notice of Rule 30(b)(1) Deposition and Subpoena Duces Tecum of Kim Slater, dated May 18, 2009 (12 pages).
U.S. District Court of Delaware Civil Action No. 08cv00189-UNA; *JPMorgan Chase & Co., et al. v. Affiliated Computer Services, Inc., et al.*—Plaintiff's Objections to Defendant's Second Notice of Rule 30(b)(6) Deposition of Plaintiff JPMorgan, dated May 15, 2009 (19 pages).
U.S. District Court of Delaware Civil Action No. 08cv00189-UNA; *JPMorgan Chase & Co., et al. v. Affiliated Computer Services, Inc., et al.*—Plaintiff's Objections to Defendant's First Notice of Rule 30(b)(6) Deposition of Plaintiff JPMorgan, dated May 15, 2009 (19 pages).
U.S. District Court of Delaware Civil Action No. 08cv00189-UNA; *JPMorgan Chase & Co., et al. v. Affiliated Computer Services, Inc., et al.*—Plaintiff's Answer to ACS's Third Amended Counterclaims, dated May 15, 2009 (18 pages).
U.S. District Court of Delaware Civil Action No. 08cv00189-UNA; *JPMorgan Chase & Co., et al. v. Affiliated Computer Services, Inc., et al.*—Redacted Version of Defendant's Answer and Counterclaims to JPMorgan Chase's Second Amended Complaint for Declaratory Judgment and Patent Infringement, dated May 8, 2009 (49 pages).
U.S. District Court of Delaware Civil Action No. 08cv00189-UNA; *JPMorgan Chase & Co., et al. v. Affiliated Computer Services, Inc., et al.*—Plaintiff's First Supplemental Objections and Responses to Defendant's Fifth Set of Interrogatories, dated Jun. 5, 2009, (19 pages).
U.S. District Court of Delaware Civil Action No. 08cv00189-UNA; *JPMorgan Chase & Co., et al. v. Affiliated Computer Services, Inc., et al.*—Defendant's Objections to Plaintiff's Third Notice of Deposition of Defendants, dated Jun. 2, 2009, (24 pages).
United States District Court for the District of Delaware, Civil Action No. 08-189-SLR (*JPMorgan Chase & Co. et al. v. Affiliated Computer Services, Inc. and ACS State & Local Solutions, Inc.*), Joint Claim Construction Statement, dated Sep. 18, 2009 (35 pages).
United States District Court for the District of Delaware, Civil Action No. 08-189-SLR (*JPMorgan Chase & Co. et al. v. Affiliated Computer Services, Inc. and ACS State & Local Solutions, Inc.*), Stipulation of Partial Dismissal Pursuant to Fed. R. Civ. P. 41(a)(1)(A)(ii) Based on Covenant and Agreement Not to Sue, dated Jul. 27, 2009 (5 pp.).
United States District Court for the District of Delaware, Civil Action No. 08-189-SLR (*JPMorgan Chase & Co. et al. v. Affiliated Computer Services, Inc. and ACS State & Local Solutions, Inc.*), Plaintiff's Unopposed Motion for Leave to File Its Third Amended and Supplemental Complaint, dated Oct. 8, 2009 (71 pp.).
United States District Court for the District of Delaware, Civil Action No. 08-189-SLR (*JPMorgan Chase & Co. et al. v. Affiliated Computer Services, Inc. and ACS State & Local Solutions, Inc.*), Public Version of vol. 1 of Exhibits to Third Amended and Supplemental Complaint for Declaratory Judgment and Patent Infringement, Exhibits A-F, dated Oct. 14, 2009 (273 pp.).
United States District Court for the District of Delaware, Civil Action No. 08-189-SLR (*JPMorgan Chase & Co. et al. v. Affiliated Computer Services, Inc. and ACS State & Local Solutions, Inc.*), Public Version of vol. 2 of Exhibits to Third Amended and Supplemental Complaint—Exhibits G-N, dated Oct. 14, 2009 (122 pp.).
United States District Court for the District of Delaware, Civil Action No. 08-189-SLR (*JPMorgan Chase & Co. et al. v. Affiliated Computer Services, Inc. and ACS State & Local Solutions, Inc.*), Public Version of vol. 3 of Exhibits to Third Amended and Supplemental Complaint—Exhibits O-W, dated Oct. 14, 2009 (353 pp.).
United States District Court for the District of Delaware, Civil Action No. 08-189-SLR (*JPMorgan Chase & Co. et al. v. Affiliated Computer Services, Inc. and ACS State & Local Solutions, Inc.*), Public Version of vol. 4 of Exhibits to Third Amended and Supplemental Complaint—Exhibits X-PP, dated Oct. 14, 2009 (209 pp.).
United States District Court for the District of Delaware, Civil Action No. 08-189-SLR (*JPMorgan Chase & Co. et al. v. Affiliated Computer Services, Inc. and ACS State & Local Solutions, Inc.*), ACS's Second Supplemental Objections and Responses to Plaintiff's First

(56) References Cited

OTHER PUBLICATIONS

Amended and Consolidated Interrogatory 13 to Defendants Affiliated Computer Services, Inc. and ACS State & Local Solutions, Inc., dated Oct. 19, 2009 (74 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Objections and Responses to Plaintiffs' Supplemental Fifth Set of Interrogatories to Defendants Affiliated Computer Services, Inc. and ACS State & Local Solutions, Inc., dated Oct. 19, 2009 (17 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of Third Amended and Supplemental Complaint for Declaratory Judgment and Patent Infringement, dated Oct. 21, 2009 (63 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 1 of Exhibits to Third Amended and Supplemental Complaint—Exhibits A-F, dated Oct. 21, 2009 (273 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 2 of Exhibits to Third Amended and Supplemental Complaint—Exhibits G-N, dated Oct. 21, 2009 (122 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 3 of Exhibits to Third Amended and Supplemental Complaint—Exhibits O-W, dated Oct. 21, 2009 (353 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 4 of Exhibits to Third Amended and Supplemental Complaint—Exhibits X-PP, dated Oct. 21, 2009 (209 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Fifth Supplemental Objections and Responses to Plaintiff's First Amended and Consolidated Set of Interrogatories to Defendants Affiliated Computer Services, Inc. and ACS State & Local Solutions, Inc., dated Oct. 29, 2009 (42 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Answer and Counterclaim to JPMorgan Chase's Third Amended and Supplemental Complaint for Declaratory Judgment and Patent Infringement, dated Oct. 30, 2009 (56 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), JPMorgan's Opening Claim Construction Brief, dated Nov. 6, 2009 (46 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Defendant ACS's Opening Brief on Claim Construction, dated Nov. 6, 2009 (67 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Stipulation of Partial Dismissal Pursuant to Fed.R.Civ.P. 41(a)(1)(A)(ii) Based on Covenant and Agreement Not to Sue, dated Nov. 17, 2009 (7 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's First Supplemental Objections and Responses to Plaintiff's Fourth Set of Interrogatories to Defendants Affiliated Computer Services, Inc. and ACS State & Local Solutions, Inc. (No. 41), dated Nov. 18, 2009 (12 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Sixth Supplemental Objections and Responses to Plaintiff's First Amended and Consolidated Set of Interrogatories to Defendants Affiliated Computer Services, Inc. and ACS State & Local Solutions, Inc., dated Nov. 18, 2009 (139 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's First Supplemental Objections and Responses to Plaintiff's Third Set of Interrogatories to Defendants Affiliated Computer Services, Inc. and ACS State & Local Solutions, Inc. (Nos. 27-40), dated Nov. 18, 2009 (61 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Fifth Supplemental Objections and Responses to Plaintiff's Second Set of Interrogatories to Defendants Affiliated Computer Services, Inc. and ACS State & Local Solutions, Inc., dated Nov. 18, 2009 (89 pp.).
U.S. District Court, District of Delaware Civ. Action No. 08-189-SLR: *JPMorgan Chase* v. *Affiliated Computer Services*, Answer to Complaint for Declaratory Judgment and Patent Infringement, (May 23, 2008), (26 pp.).
U.S. District Court of Delaware Civ. Action No. 08-189-SLR: *JPMorgan Chase* v. *Affiliated Computer Services*, Plaintiff's Objections and Responses to Defendants' First Set of Interrogatories, (Aug. 4, 2008), (27 pp.).
U.S. District Court of Delaware Civil Action No. 08cv00189-UNA; *JPMorgan Chase* v. *Affiliated Computer Services Inc., et al.*, Complaint for Declaratory Judgment and Patent Infringement, (Apr. 4, 2008), (33 pp.).
U.S. District Court of Delaware Civil Action No. 08cv00189-UNA; *JPMorgan Chase* v. *Affiliated Computer Services Inc., et al.*,—Letter dated Nov. 7, 2007 from ACS State and Local Solutions, Inc. to JPMorgan Chase & Co. regarding payment processing patents held by ACS State & Local Solutions, Inc., (1 p.), (Exhibit I).
U.S. District Court of Delaware Civil Action No. 08cv00189-UNA; *JPMorgan Chase & Co., et al.* v. *Affiliated Computer Services, Inc., et al.*—Letter dated Nov. 19, 2007 from JPMorgan Chase & Co., to ACS State and Local Solutions, Inc. regarding payment processing patents held by ACS State & Local Solutions, Inc. and Federal Express Receipt Tracking No. 790385857370, (2 pp.), (Exhibit J).
U.S. District Court of Delaware Civil Action No. 08cv00189-UNA; *JPMorgan Chase & Co., et al.* v. *Affiliated Computer Services, Inc., et al.*—Payment Processing Patents—Lotus Notes, Nov. 21, 2007, (1 p.), (Exhibit K).
U.S. District Court of Delaware Civil Action No. 08cv00189-UNA; *JPMorgan Chase & Co., et al.* v. *Affiliated Computer Services, Inc., et al.*—EPPICard—the safe and secure way to access your payments!, www.eppicard.com; (Apr. 3, 2008) (1 p.); Civil Cover Sheet (2 pp.); Civil Action No. 08-189, Acknowledgement of Receipt for AO Form 85, Notice of Availability of a United States Magistrate Judge to Exercise Jurisdiction, (1 p.), (Exhibit L).
U.S. District Court of Delaware Civil Action No. 08cv00189-SLR; *JPMorgan Chase & Co., et al.* v. *Affiliated Computer Services, Inc., et al.*—Answer to JPMorgan Chase's Complaint for Declaratory Judgment and Patent Infringement, (May 23, 2008), (26 pp.).
U.S. District Court of Delaware Civil Action No. 08cv00189-SLR; *JPMorgan Chase & Co., et al.* v. *Affiliated Computer Services, Inc., et al.*—Answer to Counterclaims for Declaratory Judgment, (Jun. 2, 2008), (6 pp.).
U.S. District Court of Delaware Civil Action No. 08cv00189-SLR; *JPMorgan Chase & Co., et al.* v. *Affiliated Computer Services, Inc., et al.*—Defendant ACS's Unopposed Motion for Leave to Amend Answer and Counterclaims, (Aug. 4, 2008), (4 pp.).
U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan

(56) References Cited

OTHER PUBLICATIONS

Chase's Complaint for Declaratory Judgment and Patent Infringement, (Aug. 8, 2008), (28 pp.); Certificate of Service, (Aug. 8, 2008), (1 p.).
U.S. District Court of Delaware Civil Action No. 08cv00189-SLR; *JPMorgan Chase & Co., et al.* v. *Affiliated Computer Services, Inc., et al.*—Answer to Amended Counterclaims for Declaratory Judgment and Patent Infringement, (Aug. 22, 2008), (11 pp.).
U.S. District Court of Delaware Civil Action No. 08cv00189-SLR; *JPMorgan Chase & Co., et al.* v. *Affiliated Computer Services, Inc., et al.*—Plaintiff's Motion for Leave to File Amended and Supplemental Complaint, (Aug. 28, 2008), (3 pp.).
U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (42 pp.).
U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (47 pp), (Exhibit 2).
U.S. District Court of Delaware Civil Action No. 08cv00189-SLR; *JPMorgan Chase & Co., et al.* v. *Affiliated Computer Services, Inc., et al.*—[Proposed] Order, (Aug. 28, 2008), (2 pp.); Rule 7.1.1 Statement, (Aug. 28, 2008), (2 pp.), (Exhibit 3).
U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 1—Exhibits A-F, (Aug. 28, 2008), (2 pp.).
U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 2—Exhibits G-N, (Aug. 28, 2008), (2 pp.).
U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 3—Exhibits O-P, (Aug. 28, 2008), (2 pp.).
U.S. District Court of Delaware Civil Action No. 08cv00189-SLR; *JPMorgan Chase & Co., et al.* v. *Affiliated Computer Services, Inc., et al.*—Letter dated Mar. 11, 2008 from ACS State and Local Solutions, Inc. to Lona S. Gros, CPPB regarding ACS Response to RFP for File No. O 51500 CP, Solicitation # 2223009 Centralized Collection Unit for the Department of Social Services, Office of Family Support, Support Enforcement Services, (filed Aug. 28, 2008), (325 pp.), (Exhibit O-Exhibit 1-11).
U.S. District Court of Delaware Civil Action No. 08cv00189-SLR; *JPMorgan Chase & Co., et al.* v. *Affiliated Computer Services, Inc., et al.*—States, Counties Automate Child Support Processing, 2008 Factiva, Inc., (Aug. 1, 1996), (filed Aug. 28, 2008), (4 pp.), (Exhibit P).
U.S. District Court of Delaware Civil Action No. 08cv00189-SLR; *JPMorgan Chase & Co., et al.* v. *Affiliated Computer Services, Inc., et al.*—Plaintiffs' Opening Brief in Support of Their Motion for Leave to File Amended and Supplemental Complaint, (Aug. 28, 2008), (10 pp.).
U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc. Answer and Counterclaims to JPMorgan Chase's First Amended and Supplemental Complaint for Declaratory Judgment and Patent Infringement, (Sep. 22, 2008), (34 pp.).
U.S. District Court of Delaware Civil Action No. 08cv00189-SLR; *JPMorgan Chase & Co., et al.* v. *Affiliated Computer Services, Inc., et al.*—Answer to ACS's Counterclaims to JPMorgan's First Amended and Supplemental Complaint for Declaratory Judgment and Patent Infringement, (Oct. 9, 2008), (12 pp.).
U.S. District Court of Delaware Civil Action No. 08cv00189-SLR; *JPMorgan Chase & Co., et al.* v. *Affiliated Computer Services, Inc., et al.*—Defendant ACS's Motion for Leave to File First Amended Answer and Counterclaims to JPMorgan's First Amended and Supplemental Complaint, (Dec. 10, 2008), (3 pp.).
U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Complaint for Declaratory Judgment and Patent Infringement, (Dec. 10, 2008), (39 pp.).
Vans (Value-Added Networks), Website at http://ganges.cs.tcd.ie/4ba2/edi/www_vans.html (May 30, 1997), 7 pages.
"Vans Valued-Added Networks" paper, no date (6 pages).
"Wage Garnishment Processing Service", published by Automatic Data Processing, Inc., 1996 (2 pages).
Workshop Materials Houston Chapter of the American Payroll Association, Jul. 21, 1995 (63 pages).
Zeidner, Rita, Comments, American Payroll Association, Mar. 22, 1996 (6 pages).

| FIELD | 1 | 2 | 3 | 4 | 5 | 6 | 7 | 8 | 9 | 10 | 11 |
|---|---|---|---|---|---|---|---|---|---|---|---|
| DATA ELEMENT NAME | RECORD TYPE CODE | TRANSACTION CODE | RECEIVING DFI IDENTIFICATION | CHECK DIGIT | DFI ACCOUNT NUMBER | AMOUNT | IDENTIFICATION NUMBER | RECEIVING COMPANY NAME | DISCRETIONARY DATA | ADDENDA RECORD INDICATOR | TRACE NUMBER |
| FIELD INCLUSION REQUIREMENT | M | M | M | M | R | M | O | R | O | M | M |
| CONTENTS | '6' | NUMERIC | TTTTAAAA | NUMERIC | ALPHANUMERIC | $$$$$$$$¢¢ | ALPHANUMERIC | ALPHANUMERIC | ALPHANUMERIC | NUMERIC | NUMERIC |
| LENGTH | 1 | 2 | 8 | 1 | 17 | 10 | 15 | 22 | 2 | 1 | 15 |
| POSITION | 01-01 | 02-03 | 04-11 | 12-12 | 13-39 | 30-39 | 40-54 | 55-76 | 77-76 | 79-79 | 80-94 |

FIGURE 8A

| FIELD | 1 | 2 | 3 | 4 | 5 | 6 | 7 | 8 | 9 |
|---|---|---|---|---|---|---|---|---|---|
| DATA ELEMENT NAME | RECORD TYPE CODE | TRANSACTION CODE | RECEIVING DFI IDENTIFICATION | CHECK DIGIT | DFI ACCOUNT NUMBER | TOTAL AMOUNT | IDENTIFICATION NUMBER | NUMBER OF ADDENDA RECORDS | RECEIVING COMPANY NAMED NUMBER |
| FIELD INCLUSION REQUIREMENT | M | M | M | M | R | M | O | R | R |
| CONTENTS | '6' | NUMERIC | TTTTAAAA | NUMERIC | ALPHANUMERIC | $$$$$$$$¢¢ | ALPHANUMERIC | NUMERIC | ALPHANUMERIC |
| LENGTH | 1 | 2 | 8 | 1 | 17 | 10 | 15 | 4 | 16 |
| POSITION | 01-01 | 02-03 | 04-11 | 12-12 | 13-39 | 30-39 | 40-54 | 55-58 | 59-74 |

| FIELD | 10 | 11 | 12 | 13 |
|---|---|---|---|---|
| DATA ELEMENT NAME | RESERVED | DISCRETIONARY DATA | ADDENDA RECORD INDICATOR | TRACE NUMBER |
| FIELD INCLUSION REQUIREMENT | N/A | O | M | M |
| CONTENTS | BLANK | ALPHANUMERIC | NUMERIC | NUMERIC |
| LENGTH | 2 | 2 | 1 | 15 |
| POSITION | 75-76 | 77-78 | 79-79 | 80-94 |

| FIELD | 1 | 2 | 3 | 4 | 5 |
|---|---|---|---|---|---|
| DATA ELEMENT NAME | RECORD TYPE RECORDING | ADDENDA TYPE CODE | PAYMENT RELATED INFORMATION | ADDENDA SEQUENCE NUMBER | ENTRY DETAIL SEQUENCE NUMBER |
| FIELD INCLUSION REQUIREMENT | M | M | O | M | M |
| CONTENTS | '7' | '05' | ALPHANUMERIC | NUMERIC | NUMERIC |
| LENGTH | 1 | 2 | 80 | 4 | 7 |
| POSITION | 01-01 | 02-03 | 04-83 | 84-87 | 88-94 |

FIGURE 9B

| ELEMENT | COMMENTS | CONTENT | ATTRIBUTES | | |
|---|---|---|---|---|---|
| | | | 1 | 2 | 3 |
| DED01 | SEGMENT IDENTIFIER | DED | M | ID | 3/3 |
| DED02 | APPLICATION IDENTIFIER | CS | M | ID | 2/2 |
| DED03 | CASE IDENTIFIER | XXXXXXXXX | M | AN | 1/20 |
| DED04 | PAY DATE | YYMMDD | M | DT | 6/6 |
| DED05 | PAYMENT AMOUNT | $$$$$$$$CC | M | N2 | 1/10 |
| DED06 | NON-CUSTODIAL PARENT SOCIAL SECURITY NUMBER | XXXXXXXXX | M | AN | 9/9 |
| DED07 | MEDICAL SUPPORT INDICATOR | 'Y'-YES, 'N'-NO | O | AN | 1/1 |
| DED08 | NON-CUSTODIAL PARENT NAME | XXXXXXXXX | O | AN | 1/10 |
| DED09 | FIPS CODE | XXXXXXX | O | AN | 5/7 |
| | EMPLOYMENT TERMINATION INDICATOR | 'Y'-YES | O | AN | 1/1 |

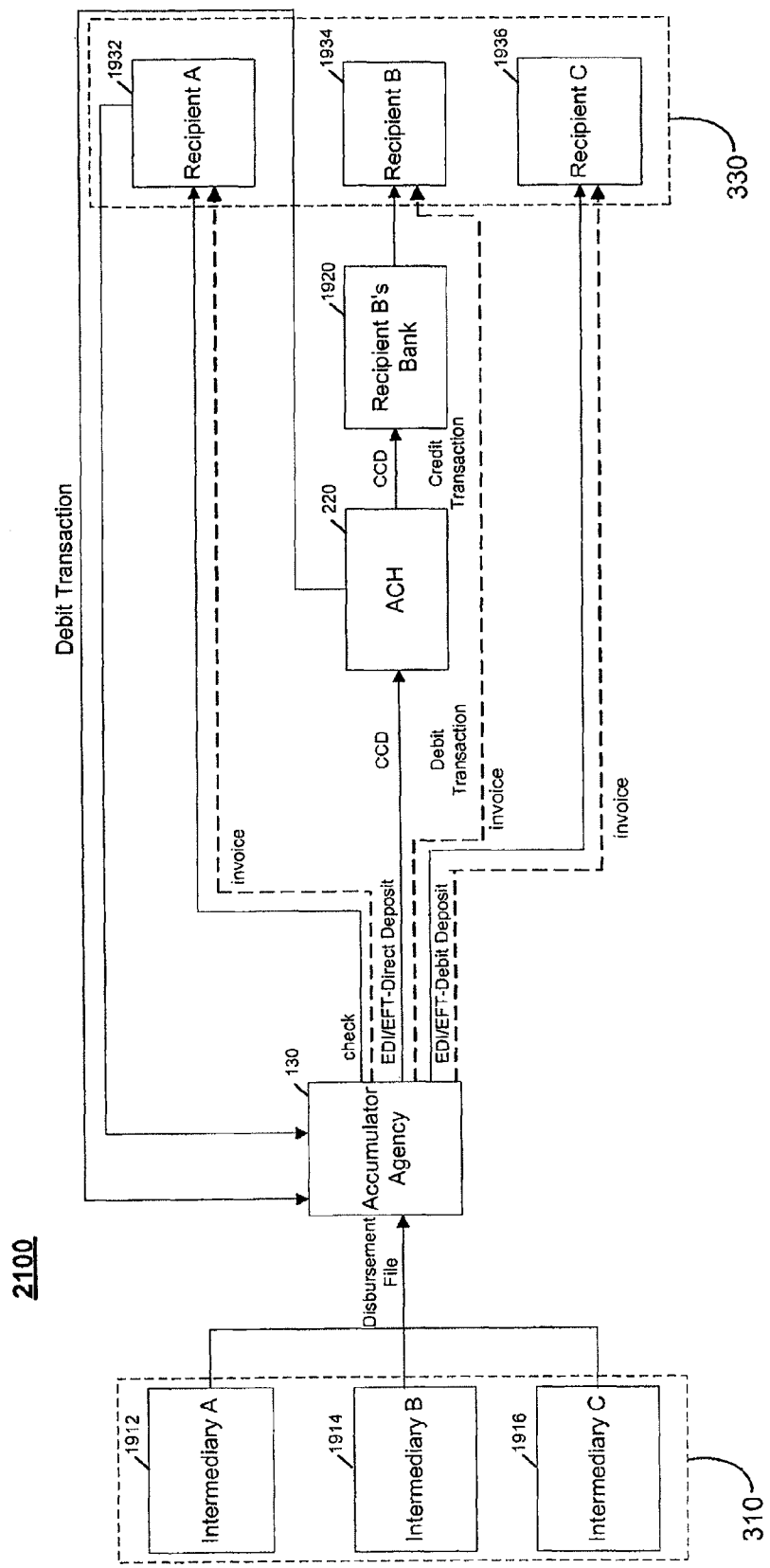

METHOD AND APPARATUS FOR PAYMENT PROCESSING USING DEBIT-BASED ELECTRONIC FUNDS TRANSFER AND DISBURSEMENT PROCESSING USING ADDENDUM-BASED ELECTRONIC DATA INTERCHANGE

This is a division of application Ser. No. 12/841,793, filed Jul. 22, 2010, which is a division of application Ser. No. 10/374,968, filed Feb. 28, 2003 (now U.S. Pat. No. 7,788,173), which is a continuation of application Ser. No. 09/413,862, filed Oct. 7, 1999 (now U.S. Pat. No. 7,225,155), which is a continuation of application Ser. No. 09/003,941, filed Jan. 7, 1998 (now U.S. Pat. No. 6,119,107), which is a division of application Ser. No. 08/941,187, filed Sep. 30, 1997 (now U.S. Pat. No. 5,946,669), all of which are incorporated herein by reference.

BACKGROUND OF THE INVENTION

1. Field of the Invention

The present invention relates generally to the processing of payments and disbursements. More particularly, the invention relates to a method and apparatus for processing payments using debit-based electronic fluids transfer and processing disbursements using addendum-based electronic data interchange.

2. Description of the Related Art

If an employee owes a permissive or mandatory obligation to a third party, the employee has few options for making recurring payments through the employer. Presently, most employers do not have the capability to process payments and disbursements for an employee through their payroll systems. If an employee has a recurring permissive obligation, the employee may make payments on this obligation through the traditional means, such as, for example, payment by cash, payment by a check, or electronic payment through the employee's bank. Similarly, if an employee has a recurring mandatory obligation, such as, for example, a child support payment, an alimony payment, or other similar court-enforced mandatory obligations, the employee may also make payments on these obligations through the same traditional methods. In either of these situations, however, there are few options for an employee to make payments or disbursements through an employer.

For recurring mandatory obligations, one option is for an employer to withhold an amount from an employee's wages and to make subsequent disbursement of the amount to a particular receiving entity. This withholding generally occurs as a court-sanctioned withholding, such as a garnishment. For example, there are presently systems that allow the payment and disbursement of child support obligations from an employer directly into the bank account of a state's child support agency. One present system comprises computer software that allows an employer to extract data from any corporate financial application in order to process the obligation. The software then connects with an automated clearinghouse and processes an electronic payment for the obligation. The electronic transaction is a credit-based transaction. In a credit-based transaction, the automated clearinghouse issues a credit to the state agency based on the amount of the obligation. The bank for the state agency receives the credit and subsequently issues a debit against the bank account of the employer. The automated clearinghouse receives the debit from the bank of the state agency and processes the debit against the bank of the employer. When the amount of the obligation is satisfied through the automated clearinghouse, the credit held by the bank of the state agency is satisfied by the debit issued against the bank of the employer. Another present system performs similar operations, but the system functions only on its own proprietary software. These current methodologies for payment and disbursement processing are inefficient and undesirable based at least on three grounds.

First, the current methods for payment and disbursement processing require that employers use credit-based transactions. These transactions involve numerous interactions with an automated clearinghouse, which involve both financial and temporal inefficiencies. A credit-based transaction is financially inefficient because this type of transaction requires more interactions with an automated clearinghouse. Each time that a transaction passes through an automated clearinghouse, a processing fee is charged. Also, a credit-based transaction is temporally inefficient. Because a credit-based transaction must pass through an automated clearinghouse in multiple incantations, this type of transaction takes more time to complete.

Second, the current methods for payment and disbursement processing only allow the processing of one financial transaction at a time. This inefficiency results because the current methods use a payment format that is limited to one financial exchange per payment or disbursement transaction. For all electronic transactions with an automated clearinghouse, there are four available formats: cash concentration or disbursement (CCD), cash concentration or disbursement plus addenda (CCD+), corporate trade exchange (CTX), and corporate trade payments (CTP). The current systems utilize the CCD+ format, a combination of the CCD format and an addendum. The CCD+ format is limited to a single addenda record and is thus limited to one payment and disbursement per transaction. An addenda record enables the exchange of electronic payments as well as payment-related information through financial institutions over an automated clearinghouse network. In contrast, the CTX format allows one electronic payment to cover multiple obligations, therefore including up to 9,999 addenda records. The CTP format utilizes a distinct combination of addenda records, but the CTP format was discontinued effective April 1996. Therefore, because the current systems only utilize the CCD+ format, they can only process transactions one at a time.

In addition to these financial and temporal inefficiencies, the current methods also contain inherent structural inefficiencies. The current methods for payment and disbursement processing all require a bank both at the beginning and at the end of each financial transaction. Accordingly, these systems do not allow the employer to initiate a financial transaction to a recipient directly through an automated clearinghouse. Instead, the systems require that an employer initiate the financial transaction at a bank, that the bank process the financial transaction through an automated clearinghouse, and that the automated clearinghouse complete the transaction between the employer and the recipient. For the current systems, these processes include multiple transactions through the automated clearinghouse. These structural inefficiencies inure due to the inability of the employer to initiate or process electronic transactions through an automated clearinghouse.

The inefficiencies and other shortcomings in the current methodologies for payment and disbursement processing reflect undesirable diminutions in capacity and quality that could be achieved by further development of improved payment and disbursement processing methods. Thus, the current payment and processing methods reflect an unsatisfactory development of methods and systems to process both the permissive and mandatory obligations of an employee by an employer and subsequent disbursement to an intended recipient.

SUMMARY OF THE INVENTION

The present invention is directed to a method and system that obviates problems due to the limitations and disadvantages of the prior art.

It is an object of one embodiment of the invention to provide a system whereby a collector of funds may easily process a payment and a disbursement.

It is another object of another embodiment of the invention to enable a collector to transmit an electronic payment and an addendum-based file to an accumulator agency for processing.

It is still another object of another embodiment of the invention to enable an accumulator agency to receive an electronic payment and to process a payment as a debit-based transaction.

It is yet another object of another embodiment of the invention to enable an accumulator agency to receive an addendum-based file and to process a disbursement based on the addendum information.

To achieve these and other objects, and in accordance with the purposes of the invention, as embodied and broadly described, one aspect of the invention includes a method of accumulating a payment and processing a disbursement. This method comprises initiating a payment with disbursement information from a payor to a payee through a collector; transferring to an accumulator agency the payment and the disbursement information from the collector; processing from the agency the payment as a debit transaction; and processing from the agency the disbursement information as an addendum transaction.

A further aspect of the invention includes a method of processing a payment. This method comprises receiving payment information at a collector; sending the payment information from the collector to an accumulator agency; receiving at the accumulator agency payment information from the collector regarding the payment; and initiating by the accumulator agency the payment as a debit transaction.

Another aspect of the invention includes a method of processing a disbursement. This method comprises transmitting by an accumulator agency disbursement information to an intermediary; receiving at the accumulator agency disbursement transaction information from the intermediary regarding authorization for a disbursement as an addendum transaction; and executing the disbursement to a recipient.

Additional aspects of the invention are disclosed and defined by the appended claims. It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, are incorporated in and constitute a part of this specification, illustrate preferred embodiments of the invention, and, together with the description, serve to explain the principles of the invention.

In the drawings,

FIGS. 8A and 8B are samples of the contents of the financial electronic data interchange database and the electronic funds transfer database stored in the collector terminal shown in FIG. 5, the accumulator agency server shown in FIG. 6, and the intermediary/recipient terminal shown in FIG. 7;

FIGS. 9A and 9B are samples of the contents of the electronic data interchange addenda database stored in the collector terminal shown in FIG. 5, the accumulator agency server shown in FIG. 6, and the intermediary/recipient terminal shown in FIG. 7;

FIG. 21 is a block diagram of a disbursement system, in accordance with another alternative embodiment of the present invention, as shown in FIG. 3.

DESCRIPTION OF THE PREFERRED EMBODIMENTS

Introduction

The system of a preferred embodiment of the invention avoids the inefficiencies and shortcomings of the prior art payment and disbursement methodologies by integrating the collection of payment and disbursement information by an employer and transmitting the information to an accumulator agency. The accumulator agency then processes the payment as a debit-based transaction and processes the disbursement as an addendum-based transaction. In this system, all parties benefit: the payor benefits by the availability of a simple method for payment and disbursement processing through an employer, the employer benefits by a fast and inexpensive method for transmitting payments and disbursements from an employee to a recipient, and the recipient benefits from the timely transmittal and receipt of a payment. The system is also beneficial to disbursement processors because the system allows for efficient transmittal of disbursement information without payment overhead.

A preferred system consistent with the invention comprises several components, including a collector, an accumulator agency, and an intermediary/recipient. From an initiator, the collector receives payment and disbursement information, which is initially stored at the collector. The collector maintains a database of payment and disbursement information pursuant to each initiator. The accumulator agency serves as a processing station between the collector and the recipient/intermediary. The accumulator agency receives the payment and disbursement information from the collector, verifies the validity of the information, and if valid, further processes the payment and disbursement. For payment processing, the accumulator agency transmits payments as debit-based transactions. For disbursement processing, the accumulator agency transmits disbursements as addendum-based transactions.

System

Figure 1:
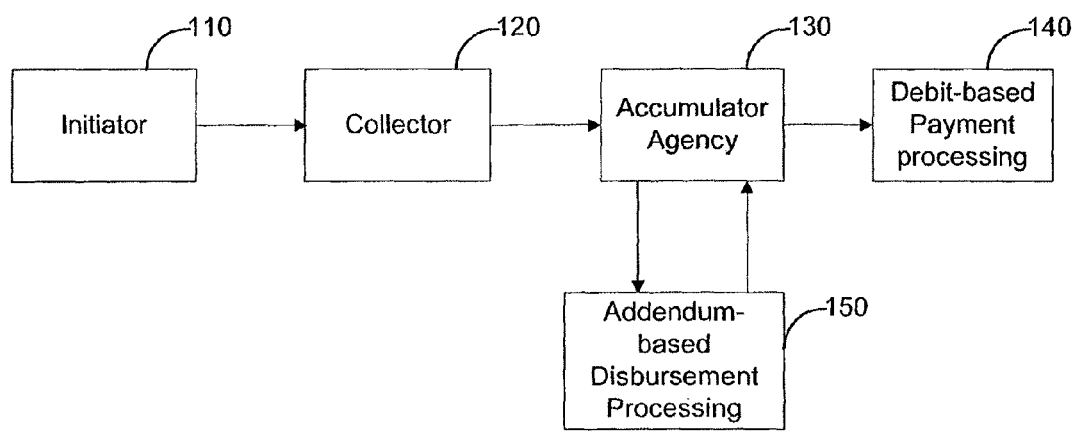
FIG. 1 is a block diagram of a payment and disbursement processing system.

FIG. 1 shows a payment and disbursement system according to one embodiment of the present invention. System 100 includes initiator 110, collector 120, accumulator agency 130, debit-based payment processing 140, and addendum-based disbursement processing 150. Initiator 110, which is preferably an employee seeking to initiate a permissive payment and disbursement or an employee subject to a mandatory payment and disbursement, transacts with collector 120, which is preferably an employer. Collector 120 receives the payment and disbursement information from initiator 110, and collector 120 records the information in a database and transmits the information to accumulator agency 130. Accumulator agency 130 verifies and processes the payment and disbursement information. For payment processing, accumulator agency 130 transmits the payment according to debit-based payment processing 140. Debit-based payment processing 140 incorporates financial processing information. For disbursement processing, accumulator agency 130 transmits disbursement information according to addendum-based disbursement processing 150. Addendum-based disbursement processing 150 incorporates the non-financial information contained within the addendum.

Figure 2:
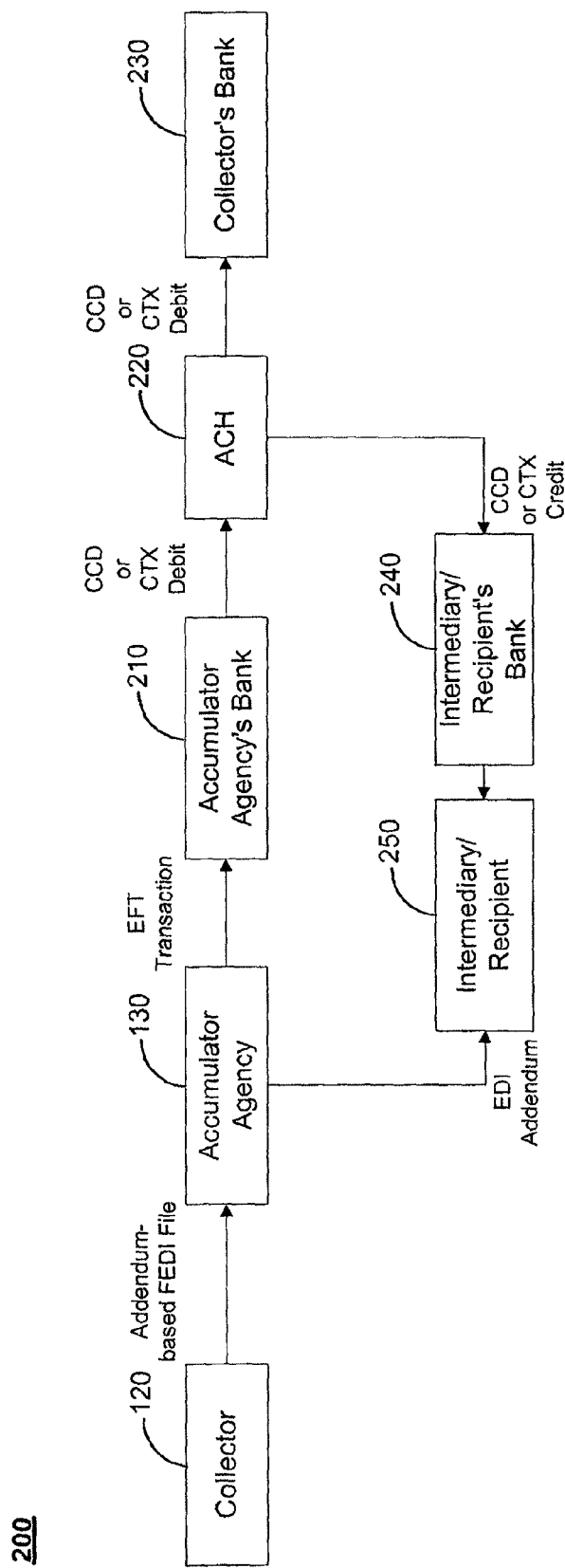
FIG. 2 is a block diagram of a debit-based payment processing system in accordance with one embodiment of the present invention, as shown in FIG. 1.

FIG. 2 illustrates an embodiment of a debit-based payment processing system consistent with system 100 shown in FIG. 1. As shown in FIG. 2, debit-based payment processing system 200 includes collector 120, accumulator agency 130, accumulator agency's bank 210, automated clearing house (ACH) 220, collector's bank 230, intermediary/recipient's bank 240, and intermediary/recipient 250. As described in FIG. 1, collector 120 receives the payment and disbursement information, records the information in a database, and then transmits the information to accumulator agency 130. The transmission of this information occurs in the form of an addendum-based financial electronic data interchange (FEDI) file. Electronic data interchange (EDI) describes the computer to computer exchange of information from one entity to another using electronic communication, and electronic funds transfer (EFT) describes the exchange of an electronic payment using electronic communication. FEDI is a combination of an EDI disbursement information with an EFT electronic payment. Accumulator agency 130 receives the FEDI file, verifies the validity of the information in the file, and then records the information in a database. Following the validation of the FEDI file, accumulator agency 130 segregates the payment information and the disbursement information from the FEDI file. Accumulator agency 130 then sends the payment information to debit-based payment processing 140 and the disbursement information to addendum-based disbursement processing 150.

For the processing of the payment according to FIG. 2, accumulator agency 130 transmits an EDI addendum to intermediary/recipient 250, with data indicating that a payment has been made. Also, accumulator agency 130 transmits an EFT transaction to accumulator agency's bank 210. Notably, accumulator agency 130 may transmit any number of EFT transactions to accumulator agency's bank 210 for processing. For example, if a payment is due to an intermediary/recipient from 500 entities, accumulator agency 130 may transmit all 500 payments as one EFT transaction to accumulator agency's bank 210 for processing. In so doing, accumulator agency 130 not only utilizes an efficient means of transmitting an EFT transaction but also saves transaction costs by using a single EFT transaction. For example, accumulator agency 130 could transmit this single EFT transaction containing 500 payments using the CTX format, which provides for up to 9,999 payments.

Once accumulator agency's bank 210 receives the EFT transaction from accumulator agency 130, accumulator agency's bank 210 must process each of the individual debit-based transactions contained within the EFT transaction. Like accumulator agency 130, accumulator agency's bank 210 may also use various EFT formats for processing multiple payments through automated clearing house (ACH) 220. ACH 240 is a clearing house for processing financial transactions through the Federal Reserve system, such as, for example, the National Automated Clearinghouse Association (NACHA).

Following transmission of the payment information to ACH 220, ACH 220 then processes the debit-based transactions initiated by accumulator agency's bank 210. Because these transactions are debit-based transactions, ACH 220 performs merely two transactions. First, ACH 220 issues a debit against the payor of the payment, and second, ACH 220 issues a credit to the recipient of the transaction. Thus, for the debit-based transactions initiated by accumulator agency's bank 210, ACH 220 initiates a debit transaction to collector's bank 230 and a credit transaction to intermediary/recipient's bank 240. Again, like collector 120 and accumulator agency 130, ACH 220 may utilize various EFT formats for multiple transmissions of these electronic transactions. Once ACH 240 has completed these transactions, payment processing has occurred, as intermediary/recipient 250 has received payment in intermediary/recipient's bank 240 from collector 120.

Figure 3:
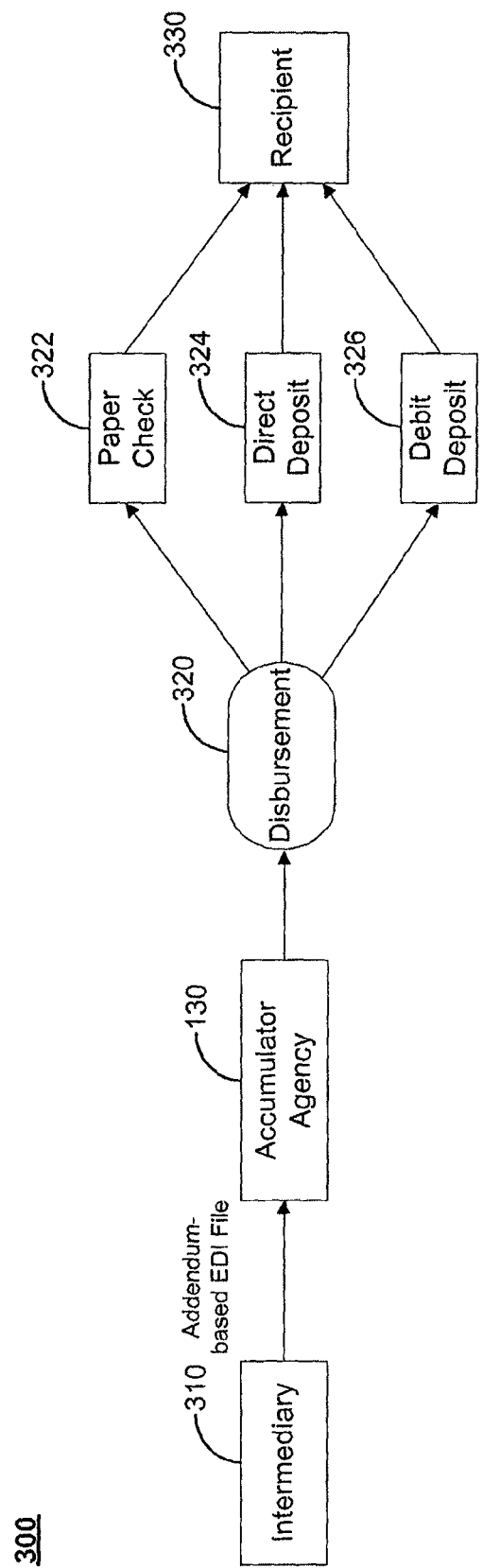
FIG. 3 is a block diagram of an addendum-based disbursement processing system in accordance with one embodiment of the present invention, as shown in FIG. 1.

FIG. 3 illustrates an embodiment of an addendum-based disbursement processing system consistent with system 100 shown in FIG. 1. As shown in FIG. 3, addendum-based disbursement processing system 300 includes intermediary 310, accumulator agency 130, disbursement 320, paper check 322, direct deposit 324, debit deposit 326, and recipient 330. As described in FIG. 1, collector 120 receives payment and disbursement information from initiator 110, records the information in a database, and then transmits the information to accumulator agency 130. The transmission of payment and disbursement information occurs via a FEDI file. Once accumulator agency 130 receives the FEDI file, and following verification, accumulator agency 130 records the information in a database and segregates the payment and the disbursement from the FEDI file. Accumulator agency 130 then processes the disbursement information according to addendum-based disbursement processing 150.

For the processing of the disbursement according to FIG. 3, intermediary 310 initially receives an EDI file from accumulator agency 130, as shown in FIG. 2. This EDI file contains information relating to the payment made by initiator 110 and requests instructions regarding the disbursement. Intermediary 310 then processes the information and determines whether a disbursement is to be made. If a disbursement is approved by intermediary 310, intermediary 310 transmits another EDI file to accumulator agency 130 with instructions for the disbursement. Accumulator agency 130 then processes disbursement 320. Disbursement 320 may include any of a number of several disbursement methods, including paper check 322, direct deposit 324, and debit deposit 326. Accumulator agency 130 processes paper check 322 by the traditional methodology, by printing and mailing the check to recipient 330. Accumulator agency 130 processes direct deposit 324 also through the traditional methods, by issuing the deposit by EFT. Accumulator agency 130 processes debit deposit 826 through any number of available options by issuing an EFT, including the creation of a debit deposit at a bank operated by a state agency or the creation of a debit deposit account at a bank operated by accumulator agency 130. Whatever the methodology for disbursement, according to system 300, disbursement 320 processes a disbursement to recipient 330 according to instructions provided to accumulator agency 130 from intermediary 310.

Figure 4:
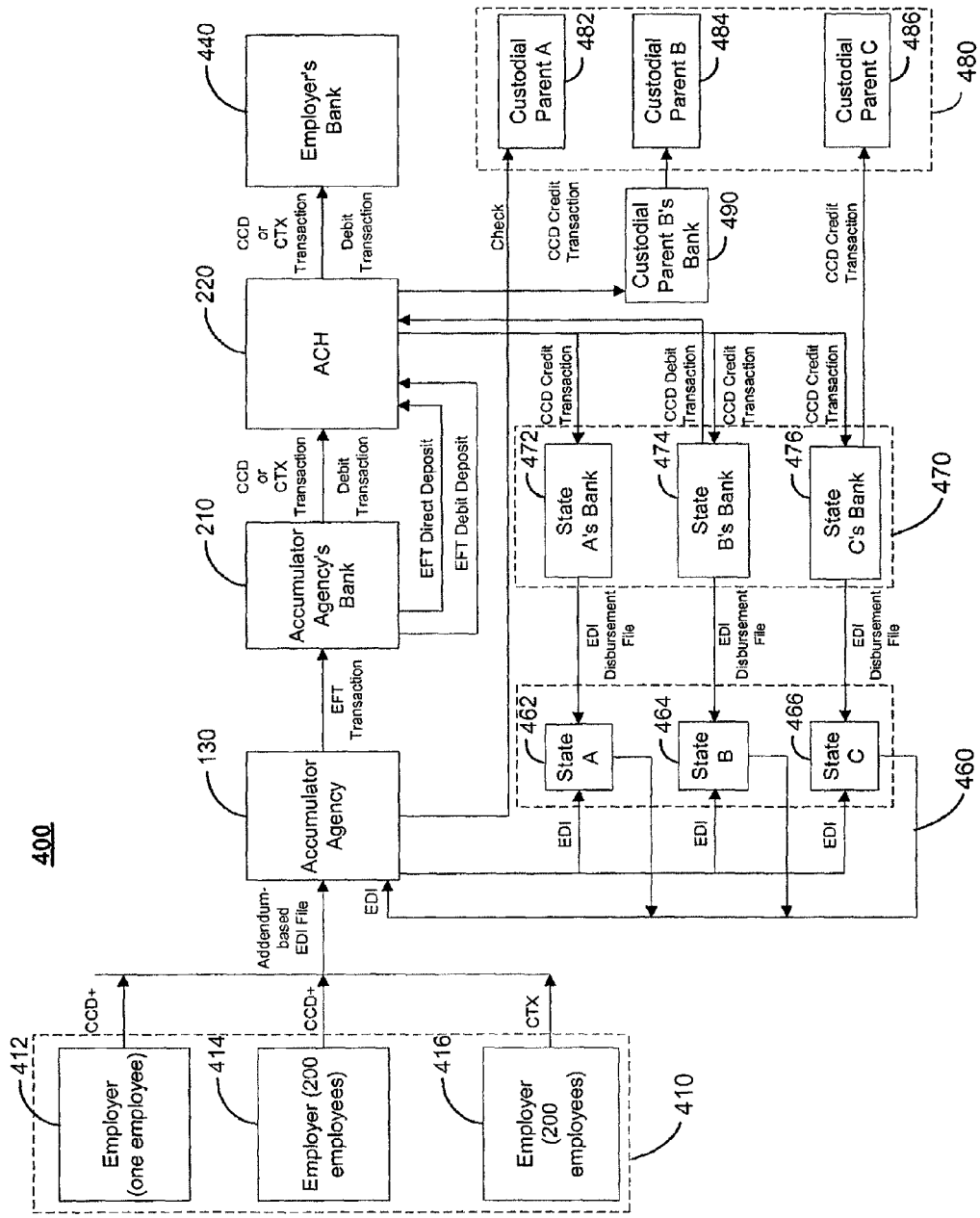
FIG. 4 is a block diagram of a payment and disbursement processing system, in accordance with a preferred embodiment of the present invention, as shown in FIG. 1.

FIG. 4 illustrates a preferred embodiment for a payment and disbursement system according to the present invention. System 400 depicts a payment and disbursement system for transmitting child support obligations from a non-custodial to a custodial parent through an employer. Of course, one skilled in the art will realize many alternative applications for this system.

As shown in FIG. 4, system 400 anticipates that initiator 110 (in the case of the preferred embodiment, an employee) has already initiated a payment and disbursement. System 400 thus shows three alternatives for collector 120 (shown here as employer 410) for initiating a payment and disbursement consistent with the invention. Employer 410 depicts alternative ways that an employer can initiate a payment and disbursement for an employee, illustrated as employer 412, employer 414, and employer 416. Employer 412 has only one employee subject to a child support obligations, employer 412 has 200 employees subject to child support obligations, and employer 416 also has 200 employees subject to child support obligations. In the case of employer 412, the FEDI file transmitted from employer 412 to accumulator agency 130 comprises the CCD+ format. As noted above, the CCD+ format provides for an EFT transaction plus an addendum, but the CCD+ format is limited to one addendum per transaction. Thus, employer 414 also utilizes the CCD+ format, but due to the limitations of this EFT format, employer 414 would be required to use 200 separate FEDI transactions in the CCD+ format. In contrast, employer 416 transmits all 200 transactions utilizing the CTX format. As noted above, the CTX format allows for the transmission of a payment with up to 9,999 addenda records. Employer 416 therefore saves both time and expense by using the CTX format. Whatever the format, once employer 410 transmits the necessary FEDI files, accumulator agency 130 receives the FEDI files from employer 410 and processes the payment and disbursement transactions.

For payment processing according to system 400, accumulator agency 130 transmits an EDI transaction to state 460 and an EFT transaction to accumulator agency's bank 210. The EDI transaction from accumulator agency 130 to state 460 indicates that a payment has been made. The EFT (or FEDI) transaction from accumulator agency 130 to accumulator agency's bank 210 contains the payment information to initiate a payment from initiator 110 (that is, a non-custodial parent) to recipient 330 (that is, custodial parent 480). As depicted in system 400, state 460 comprises state A 462, state B 464 and state C 466. System 400 contains three representations of state 460 for purposes of describing three alternatives for payment and disbursement processing. For similar reasons, system 400 contains three representations of state bank 470, including state A's bank 472, state B's bank 474, and state C's bank 476, and accordingly, system 400 contains three representations of custodial parent 480, including custodial parent A 482, custodial parent B 484, and custodial parent C 486.

Continuing with payment processing according to system 400, accumulator agency's bank 210 receives the payment information from accumulator agency 130 and processes the payment via ACH 220 as a debit-based transaction. In processing the debit-based transaction, ACH 220 issues a debit against employer's bank 440 and issues a credit to state bank 470. In this manner, the payment is completed from initiator 110, or the non-custodial parent, to state 460 via employer 410 for the benefit of recipient 330, or custodial parent 480. The particular steps associated with the processes of payment processing are described in connection of FIGS. 10-16.

For disbursement processing according to system 400, state 460 issues an EDI transaction to accumulator agency 130, authorizing a disbursement to custodial parent 480. Accumulator agency 130 then processes the disbursement 320 according to one of three methods, paper check 322, direct deposit 324, or debit deposit 326. As shown in FIG. 4, for a disbursement by paper check, state A 462 transmits an EDI file to accumulator agency 130, authorizing a disbursement to custodial parent A 482. Accumulator agency 130 then prints and issues a check directly to custodial parent A 482. For a disbursement by direct deposit, state B 464 issues an EDI file to accumulator agency 130, authorizing a disbursement to custodial parent B 484. Accumulator agency 130 then issues an EFT transaction to accumulator agency's bank 210, authorizing a direct deposit to custodial parent B 484. Accumulator agency's bank 210 issues an EFT transaction to ACH 220, initiating a direct deposit to custodial parent B 484. Based on this instruction for a direct deposit, ACH 220 issues a debit transaction against state B's bank 474 and issues a credit transaction to custodial parent B's bank 490, for the benefit of custodial parent B 484. For a disbursement by debit deposit, state C transmits an EDI to accumulator agency 130, authorizing a debit deposit to custodial parent C 486. Accumulator agency 130 transmits an EFT transaction to accumulator agency's bank 210, authorizing the creation of a debit deposit account to the benefit of custodial parent C 486. Accumulator agency's bank 210 issues an EFT transaction to ACH 220, providing for the creation of a debit deposit in state C's bank 476. Once a debit deposit is created in state C's bank 476, custodial parent C 486 may access the account and receive the disbursement. The particular steps associated with the processes of disbursement processing are described in connection with FIGS. 17-21.

In the payment and disbursement system described in FIG. 4, it should be noted that all the designations are exemplary. One skilled in the art would be able to recognize various implementations of system 400. For example, the reference to a state does not limit the scope of this invention to a state of the United States, but in the context of the preferred embodiment, the reference may apply to any local, regional, federal, or international governmental entity. In other embodiments, moreover, the reference to a state could even apply to a nongovernmental entity, such as, for example, a mutual fund, a bill payment center, or any other commercial entity. Indeed, all the designations in system 400 entail such broad applications in the context of payment and disbursement processing.

Figure 5:
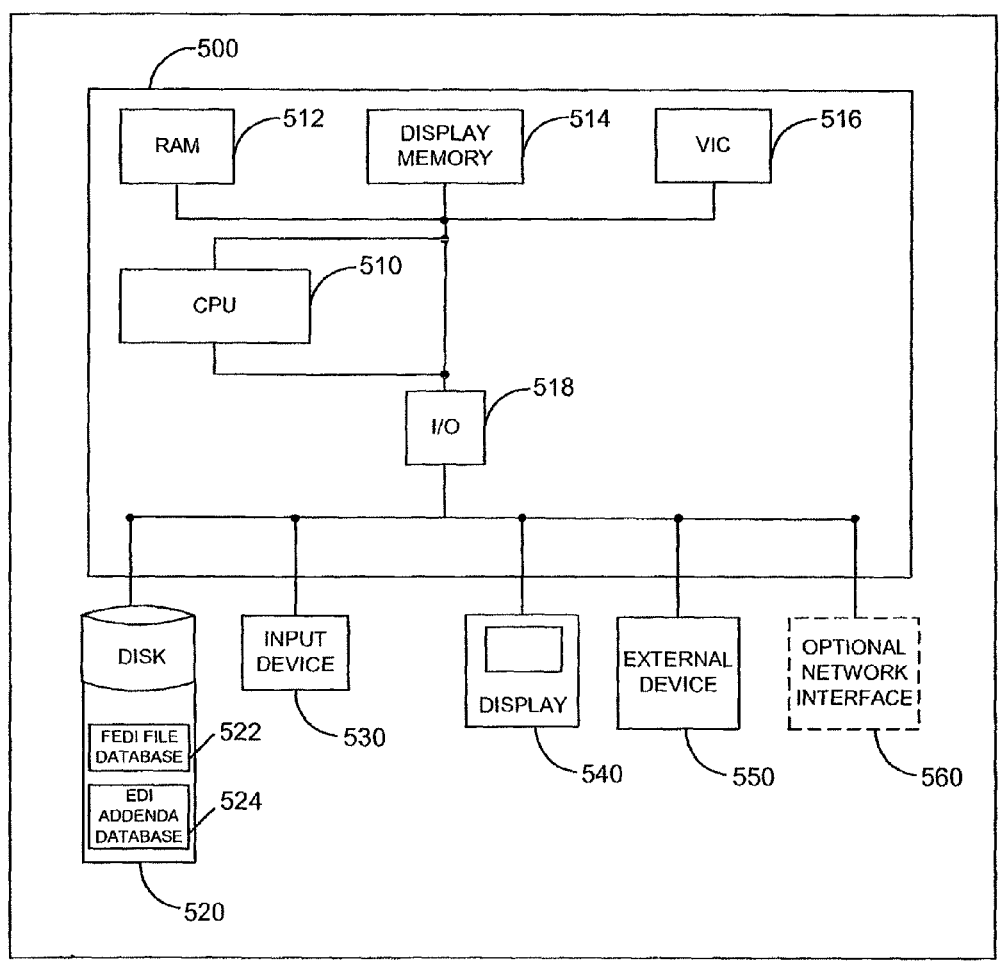
FIG. 5 is a block diagram of a collector, as shown in FIG. 1.

FIG. 5 illustrates one embodiment of collector 120 used in system 100 shown in FIG. 1. As shown in FIG. 5, collector 120 preferably includes collector terminal 500 equipped with conventional hardware, including central processing unit (CPU) 510, random access memory (RAM) 512, display memory 514, video interface circuit (VIC) 516, input/output controller (I/O) 518, data storage device (disk) 520, input device 530, display 540, external device 550, and optional network interface 560. Collector terminal 500 basically functions as a conventional data processor.

As shown in FIG. 5, CPU 510 is directly coupled to each of the other elements of collector terminal 500. CPU 510 executes program code (not shown) stored in one or more RAM 512 or disk 520 to early out the functions and acts described in connection with collector terminal 500. CPU 510 preferably comprises at least one high-speed digital data processor adequate to execute program modules consistent with the invention, such as accumulation of a payment and disbursement, transmission of a payment and disbursement, and the processing and completion of a payment and disbursement. The processes performed by these modules are described in connection with FIGS. 10-21. CPU 510 interacts with RAM 512 and disk 520 to execute stored program code according to conventional data processing techniques.

As also shown in FIG. 5, input device 530 permits collector terminal 500 to receive payment and disbursement information about initiator 110 and, although shown as a single device, may comprise one or more data input devices of various types, such as an alphanumeric keyboard, a numeric keypad, a bar code scanner, a credit card reader, a disk drive, a memory, an electronic communication line, and a wireless transceiver. Input device 530 preferably transmits received information to CPU 510 for storage in disk 520. VIC 516 comprises a video driver sending signals to display 540 displaying either text or graphics based on the contents of display memory 514. Display 540 is preferably large enough to display information relating to payment and disbursement processing for initiators 110. External device 550 allows operability of other components with collector 120, such as, for example, a modem, a printer, a scanner, a photocopying device, or any other form of input or output device. Optional network interface 560 links CPU 510 to allow communication with other collector devices, such as multiple collector terminals 500.

As shown in FIG. 5, disk 520 preferably comprises a large capacity memory capable of maintaining FEDI file database 522 and EDI addenda database 524. FEDI file database 522 contains data pertaining to payment and disbursement information accumulated from initiators 110. The contents of FEDI file database 522 are transmitted to accumulator agency 130 for processing. EDI addenda database 524 contains the disbursement information from FEDI file database 522. Data contained in one or more of these databases 522 and 524 may be periodically updated from collectors 120 via input device 530, external device 550, or optional network interface 560. Samples of the records and their respective fields contained in databases 522 and 524 are shown in and described in connection with FIGS. 8A-8B and 9A-9B.

Figure 6:
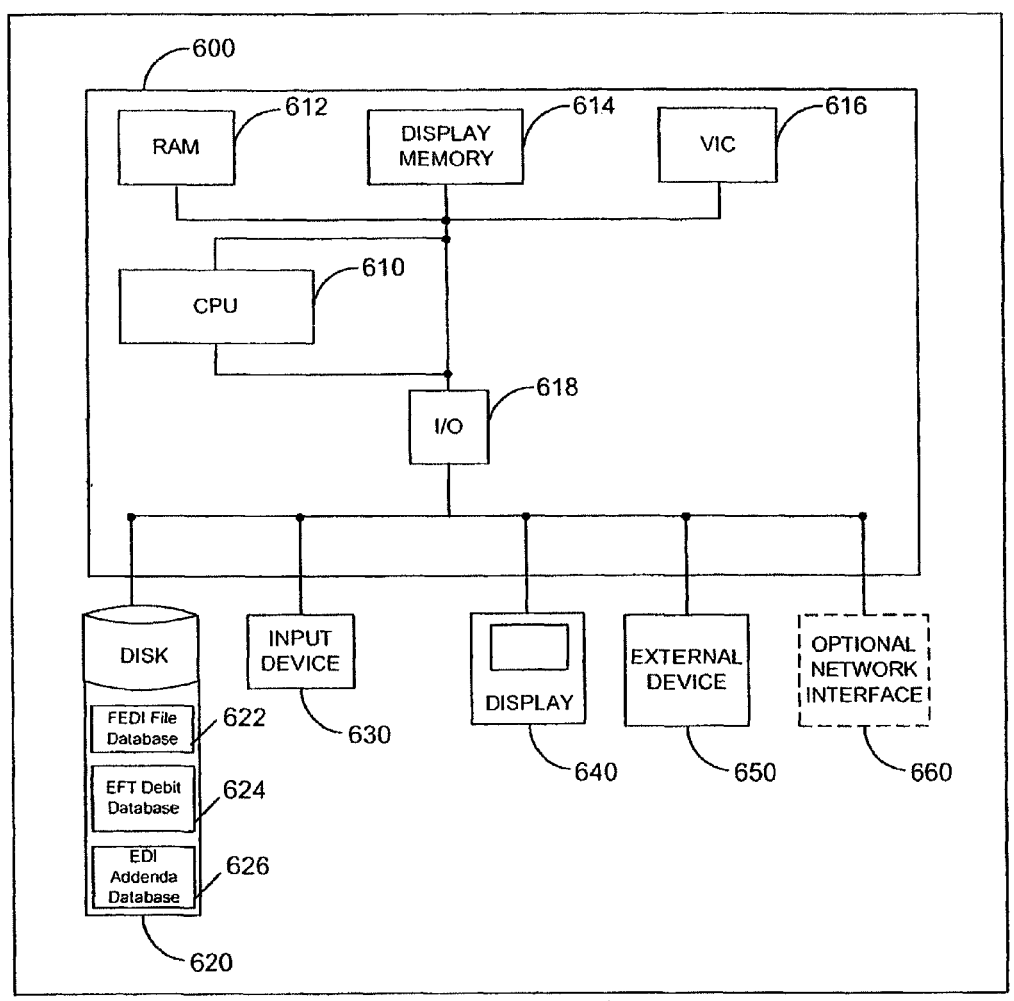
FIG. 6 is a block diagram of an accumulator agency, as shown in FIG. 1.

FIG. 6 illustrates one embodiment of accumulator agency 130 used in system 100 shown in FIG. 1. Accumulator agency 130 preferably comprises accumulator agency server 600 equipped with conventional hardware, including CPU 610, RAM 612, display memory 614, VIC 616, I/O 618, disk 620, input device 630, display 640, external device 650, and optional network interface 660. In general, elements of accumulator agency server 600 common to collector terminal 500 preferably operate in substantially the same manner as described above. Because accumulator agency server 600 may service one or more external devices 650, accumulator agency server 600 is preferably capable of interfacing with one or more collector terminals 500. Alternatively, accumulator agency server 600 130 may also interface with one or more collector terminals 500 via optional network interface 660.

As shown in FIG. 6, disk 620 preferably comprises a large capacity memory capable of maintaining FEDI file database 622, EFT debit database 624, and EDI addenda database 626. FEDI file database 622 contains data pertaining to the payment and disbursement information transmitted by collector terminals 500. Indeed, FEDI file database 622 contains data corresponding to FEDI file database 522. EFT debit database 624 contains the payment information from FEDI file database 622. EDI addenda database 626 contains the disbursement information from FEDI file database 622. Data contained in one or more of these databases 622, 624, and 626 may be periodically obtained and updated from collector terminals 500 via external device 650 or optional network interface 660. Samples of the records and their respective fields contained in databases 622, 624, and 626 are shown in and described in connection with FIGS. 8A-8B and 9A and 9B.

Figure 7:
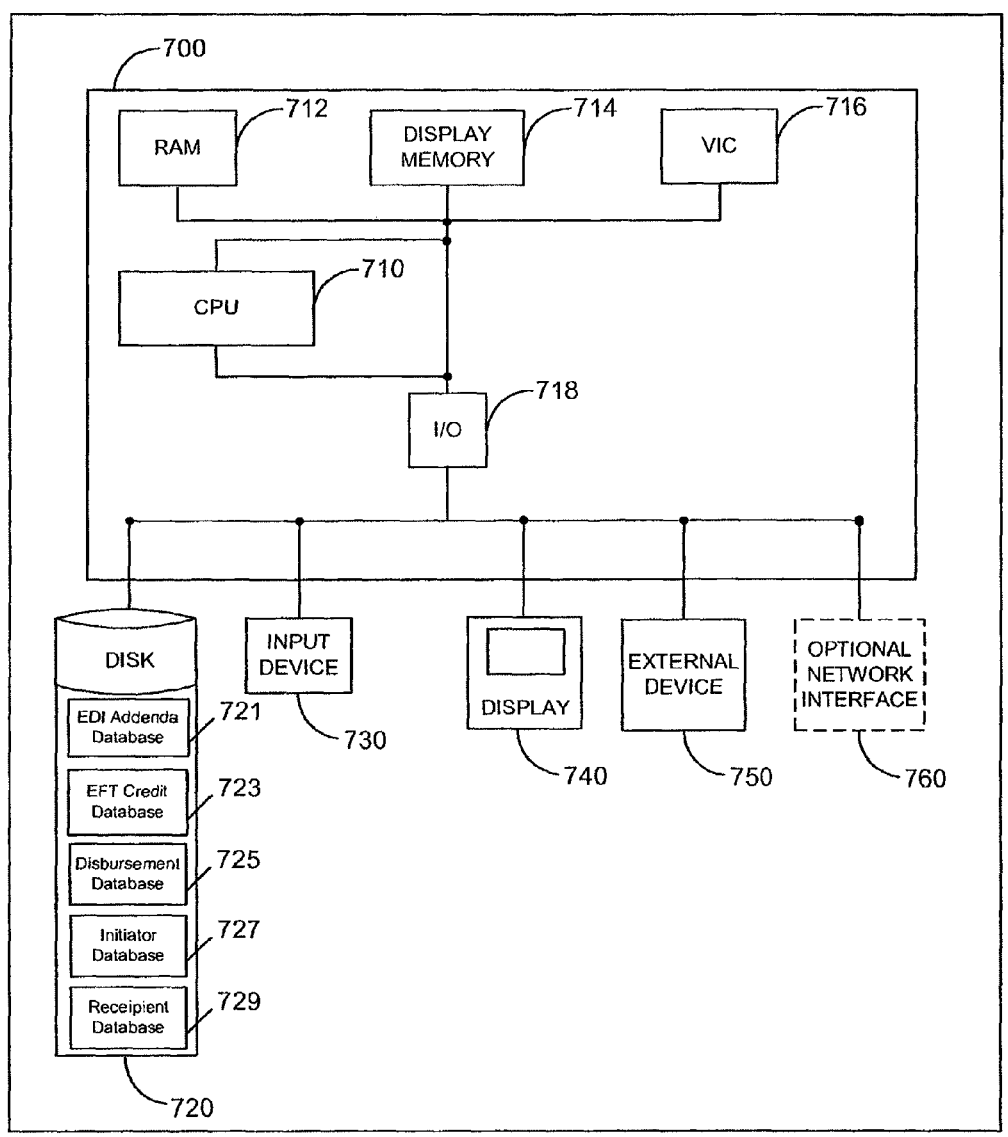
FIG. 7 is a block diagram of an intermediary/recipient, as shown in FIG. 2.

FIG. 7 illustrates one embodiment of intermediary/recipient 250 used in system 200 shown in FIG. 2. Intermediary/recipient 250 preferably comprises intermediary/recipient terminal 700 equipped with conventional hardware, including CPU 710, RAM 712, display memory 714, VIC 716, I/O 718, disk 720, input device 730, display 740, external device 750, and optional network interface 760. Again, elements of intermediary/recipient terminal 700 common to collector terminal 500 or accumulator agency server 600 preferably operate in substantially the same manner as described above. External device 750 or optional network interface 760 allows connectivity of intermediary/recipient terminal 700 to external computers or networks. In a preferred embodiment, one such external computer is accumulator agency server 600.

As shown in FIG. 7, disk 720 maintains EDI addenda database 721, EFT credit database 723, disbursement database 725, initiator database 727, and recipient database 729. EDI addenda database 721 contains the addendum information transmitted by accumulator agency server 600. Indeed, EDI addenda database 721 contains data corresponding to EDI addenda database 626. EFT credit database 723 contains the credit transactions transmitted from ACH 220. Disbursement database 725 contains information designating whether a disbursement will be authorized and transmitted to accumulator agency server 600. Initiator database 727 contains a listing of authorized initiators for payment transactions.

Recipient database 729 contains a listing of the authorized recipients for the receipt of disbursements. Samples of the records and their respective fields contained in databases 721, 723, 725, 727, and 729 are shown in and described in connection with FIGS. 8A-8B and 9A-9B.

Database Formats

Samples of the contents of FEDI file database 522, EDI addenda database 524, FEDI file database 622, EFT debit database 624, EDI addenda database 626, EDI addenda database 721, EFT credit database 723, disbursement database 725, initiator database 727, and recipient database 729 are shown in FIGS. 8A-8B and 9A-9B. The specific data and fields illustrated in these figures represent only one embodiment of the records stored in the databases consistent with the invention. In most cases, the fields shown in FIGS. 8A-8B and 9A-9B are relatively straight forward and self-explanatory. In addition to the disclosed databases, the data and fields of these databases, as well as the number of databases, can be readily modified from the described embodiments, for example, to include more or fewer data fields.

FEDI file database 522 maintained in collector terminal 500 contains a listing of information relating to payments and disbursements for use by collector terminal 500. FIGS. 8A and 8B illustrate a sample of the contents of FEDI file database 522, with FIG. 8A depicting a sample of the contents of a FEDI file in the CCD format and FIG. 8B depicting a sample of a FEDI file in the CTX format.

As shown in FIG. 8A, using the CCD format, FEDI file database 522 contains eleven fields with data element names corresponding to, for example, record type code, transaction code, receiving depository financial institution (DFI) identification, check digit, DFI account number, amount, identification number, receiving company name, discretionary data, addenda record indicator, and trace number. FIG. 8A also indicates the attributes of each field. After the field row and the data element name row, the field inclusion requirement row indicates the requirements for each of the eleven fields, "M" indicating a mandatory element, "R" indicating a required element, and "O" indicating an optional element. The contents row indicates a sample structure for the contents of each field, and the link row indicates the length of characters available for each field. Finally, the position row indicates the position of the data element in the database record. The CCD format allows a database record of 94 characters.

For field 1, located at position 01-01, record type code allows a single character, which the example shows as a "6."

For field 2, located at position 02-03, transaction code encompasses two characters, which the example shows as requiring a numeric form.

For field 3, located at position 04-11, receiving DFI identification provides for 8 characters, which the example depicts in the form, "TTTTAAAA."

For field 4, located at position 12-12, check digit encompasses a single character, which the example shows as requiring a numeric form.

For field 5, located at position 13-39, DFI account number entails 17 characters, which the example shows as allowing any alphanumeric form.

For field 6, located at position 30-39, amount provides for a character length of 10, which the example shows as $$$$$$$$¢¢ (thus, allowing a numerical entry of 999,999.99 or below).

For field 7, located at position 40-54, identification number spans 15 characters, which the example shows as allowing any alphanumeric form.

For field 8, located at position 55-76, receiving company name encompasses 22 characters, which the example shows as allowing any alphanumeric form.

For field 9, located at position 77-76, discretionary data involves only 2 characters, which the example shows as allowing any alphanumeric form.

For field 10, located at position 79-79, addenda record indicator allows a single character, which the example shows as requiring a numeric form.

For field 11, located at position 80-94, trace number encompasses a number of up to 15 characters, which the example shows as requiring a numeric form.

As shown in FIG. 8B, using the CTX format, FEDI file database 522 may also contain thirteen fields with data element names corresponding to, for example, record type code, transaction code, receiving DFI identification, check digit, DFI account number, total amount, identification number, number of addenda records, receiving company name/ID number, reserved, discretionary data, addenda record indicator, and trace number. The CTX format also allows a database record of 94 characters. Indeed, the 13 fields of FIG. 8B correspond to the fields described in FIG. 8A, except that FIG. 8B contains two additional fields, namely, number of addenda records (field 8) and reserved (field 10). For field 8, located at position 55-58 of the addenda for the CTX format, number of addenda records encompasses 4 characters, which the example shows as requiring a numeric form; for field 10, located at position 75-76 of the addenda for the CTX format, reserved provides for 2 characters, which the example indicates as "blank" due to the reserved status of this field. Otherwise, the fields of the CTX format correspond exactly to the fields of the CCD format. Indeed, both the CTX format and the CCD format contain 94 characters. Accordingly, FEDI file database 522 contains fields corresponding to either the CCD or CTX format, and in either case, the number of characters in the database for each record does not exceed 94.

Notably, FIGS. 8A and 8B only depict the fields for the EFT-portion of the FEDI file. Accordingly, these fields for the CCD and CTX formats operate according to the Operating Rules and Guidelines of the National Automated Clearinghouse Association (NACHA), hereby incorporated by reference.

Also maintained in collector terminal 500, EDI addenda database 524 contains a listing of the information relating to disbursements either authorized by or required from initiators 110. As shown in FIGS. 8A and 8B, the addenda record indicator (field 10 for CCD, field 12 for CTX) designates the presence or absence of an addenda record in an FEDI file. If this flag is positive, FIG. 9A illustrates a sample of the contents of such an addenda record. As shown in FIG. 9A, an addenda record contains five fields with data element names corresponding to, for example, record type code, addenda type code, payment related information, addenda sequence number, and entry detail sequence number. The row structure of the addenda record depicted in FIG. 9A corresponds to the structure and contents of the rows in FIGS. 8A-8B. Of the five fields shown in FIG. 9A, payment related information (field 3) contains the pertinent disbursement information, in the context of EDI addenda database 524.

FIG. 9B illustrates a sample of the contents of EDI addenda database 524, in its preferred implementation of a payment and disbursement processing system for child support payments. As shown in FIG. 9B, EDI addenda database 524 contains records having fields with segment identifiers for deductions (DED) corresponding to, for example, application identifier DED01, case identifier DED02, pay date DED03, payment amount DED04, non-custodial parent social security number DED05, medical support indicator DED06, non-custodial parent name DED07, FIPS code DED08, an employment termination indicator DED09. Therefore, as shown in FIG. 9B, the addenda record for a child support payment contains nine segment identifiers.

Application identifier DED01 indicates the type of deduction being withheld from an employee's pay.

Case identifier DED02 is the case number or court order number that the child support receiving agency uses for the processing of payments and disbursements.

Pay date DED03 indicates the pay date or the date of income withholding from the non-custodial parent.

Payment amount DED04 indicates the amount of withholding from the pay of the non-custodial parent, which is paid to the child support receiving agency.

Non-custodial parent social security number DED05 provides the child support receiving agency with the social security number of the non-custodial parent.

Medical support indicator DED06 indicates whether the non-custodial parent has family medical insurance available through his or her employer.

Non-custodial parent name DED07 indicates the first seven letters of the last name of the non-custodial parent followed by at least three of the first three letters of his or her first name.

Federal information process standard (FIPS) code DED08 refers to the code used by the child support entity receiving the transaction, usually indicating the state and county of the child support entity.

Employment termination indicator DED09 is used to indicate to the child support enforcement agency that the non-custodial parent's employment has been terminated.

For the contents of an EDI addendum for child support payment and disbursement, FIG. 9B also indicates the mandatory and permissive attributes of each field. Attribute column 1 indicates the field requirement, "M" indicating a mandatory element and "O" indicating an optional element. Attribute column 2 indicates the data type, including "AN" for string type data, "DT" for date type data, "ID" for identifier data from a predefined list of values, and "N2" indicating a numeric type data with two decimal places to the right of a fixed decimal point (indicating a financial amount). Attribute column 3 indicates the minimum/maximum allowable length for the element, for example, 1/20 indicates a minimum of one character and a maximum of 20 characters.

Of course, the example of the addenda requirements for a child support payment and disbursement are only one implementation of a system consistent with the present invention. Other implementations for payment and disbursement processing may also be used, such as, for example, alimony payments, payments on a judgment, payments on an attachment, tax payments, or even permissive payments, such as, for example, payments for investments or a mutual fund, payments upon a loan, or any other form of private or commercial obligation.

FEDI file database 622 maintained in accumulator agency server 600 contains a listing of information corresponding to FEDI file database 522. FEDI file database 622 contains those FEDI files transmitted to accumulator agency server 600 by collector terminals 500. Following transmission of these FEDI files, accumulator agency server 600 then validates the information, and if valid, segregates the EFT information from the EDI information. EFT debit database 624 contains the EFT information obtained from FEDI file database 622, and EDI addenda database 626 contains the EDI information obtained from FEDI file database 622. As described above, FIGS. 8A and 8B show samples of EFT information, and FIGS. 9A and 9B show samples of EDI information. EFT debit database 624 and EDT addenda database 626 contain information consistent with that shown in and described in connection with FIGS. 8A-8B and 9A-9B.

EDI addenda database 721 maintained in intermediary/recipient terminals 700 contains a listing of disbursement information corresponding to the EDI information transmitted to intermediary/recipient terminal 700 from accumulator agency server 600, which was transmitted to accumulator agency server 600 from collector terminals 500. EDI addenda database 721 contains information similar to that contained within EDI addenda database 524 and EDI addenda database 626. FIGS. 9A and 9B show samples of EDI information. Intermediary/recipient terminal 700 receives EDI transactions into EDI addenda database 721 from accumulator agency server 600 in order to process disbursements according to the information contained within the EDI addenda.

EFT credit database 723 maintained in intermediary/recipient terminal 700 contains information relating to payments processed through accumulator agency's bank 210 and ACH 220 for the purpose of later distribution and processing. In an implementation pertaining to child support, once initiator 110, or a non-custodial parent, has issued a payment through employer 410 to custodial parent 480, EFT credit database 723 indicates to intermediary/recipient terminal 700 (such as a terminal at a state child support agency) that the non-custodial parent has paid the obligation. Once the payment has occurred, intermediary/recipient terminal 700 may then authorize the disbursement to custodial parent 480.

Disbursement database 725, initiator database 727, and recipient database 729 maintained in intermediary/recipient terminal 700 enable authorization of disbursements pursuant to the information contained within EDI addenda database 721. Initiator database 727 contains a listing of the authorized initiators for payment processing, recipient database 729 contains a listing of the authorized recipients for disbursement processing, and disbursement database 729 contains a listing of disbursements authorized for processing. EFT credit database 723 thus indicates to disbursement database 725 whether a disbursement is authorized. Once a disbursement is authorized under disbursement database 725, intermediary/recipient terminal 700 transmits such authorization to accumulator agency server 600. Disbursement database 725 may also contain a historical database of prior disbursements. In an implementation pertaining to child support, for example, initiator database 727 would contain a listing of initiators 110, or non-custodial parents, recipient database 729 would contain a listing of custodial parents 480, and disbursement database 729 would contain the information regarding payments due by the non-custodial parents to custodial parents for child support obligations.

Process

In processing a payment and disbursement from collector 120 (such as an employer) based on an obligation of initiator 110 (such as an employee), the system shown and described in connection with FIG. 1 preferably executes several distinct modules, or processes. These processes include facilitating the accumulation of a payment and disbursement at collector 120 from initiator 110, transmitting the payment and disbursement information from collector 120 to accumulator agency 130, processing the payment via debit-based payment processing 140, and processing the disbursement via addendum-based disbursement processing 150. The steps associated with these processes are described in connection with FIGS. 10-21 and can be performed in any order, unless otherwise specified or dictated by the steps themselves.

Figure 10:
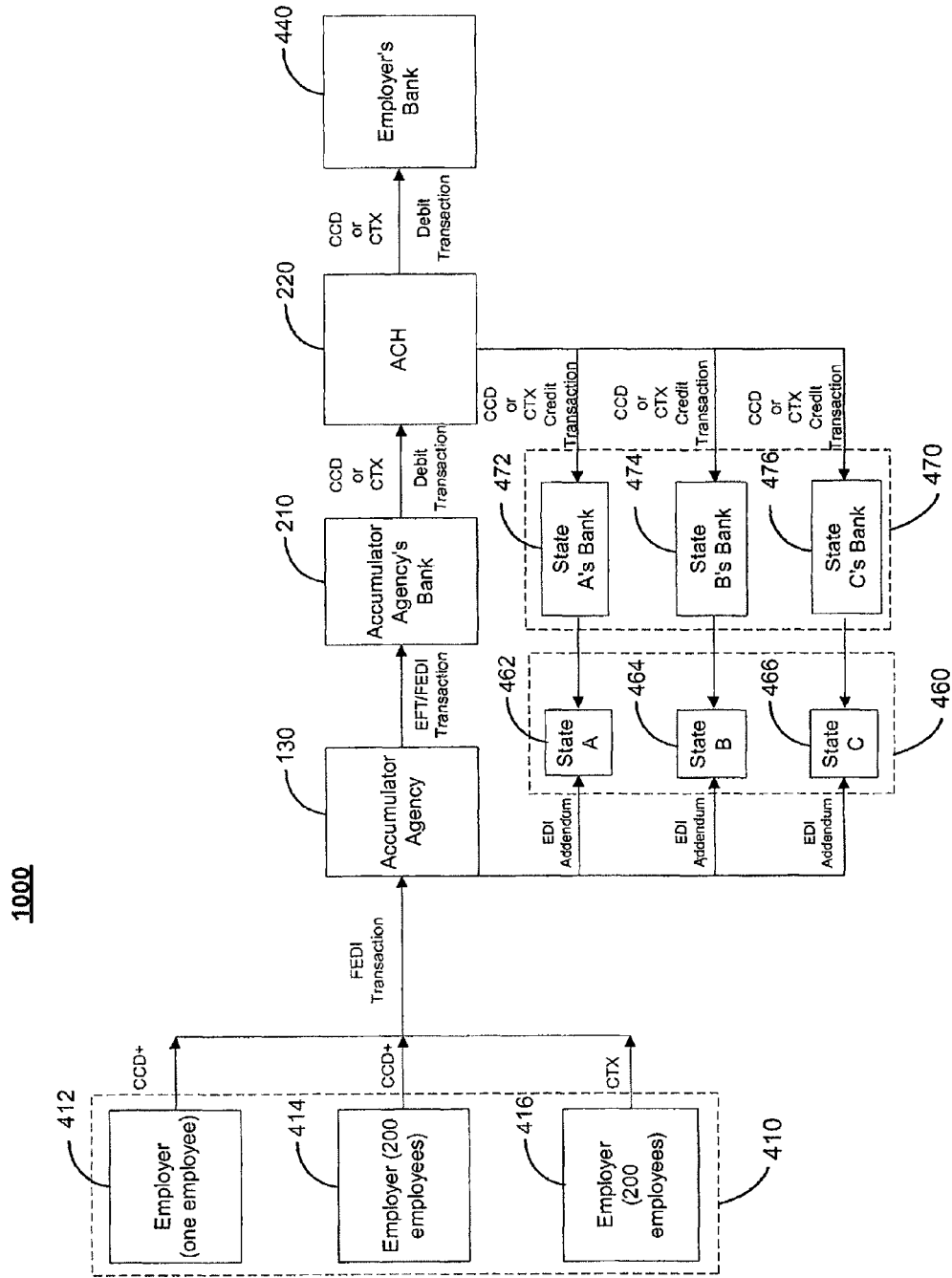
FIG. 10 is a block diagram of a payment processing system, in accordance with the preferred embodiment of the present invention, as shown in FIG. 4.
Figure 11:
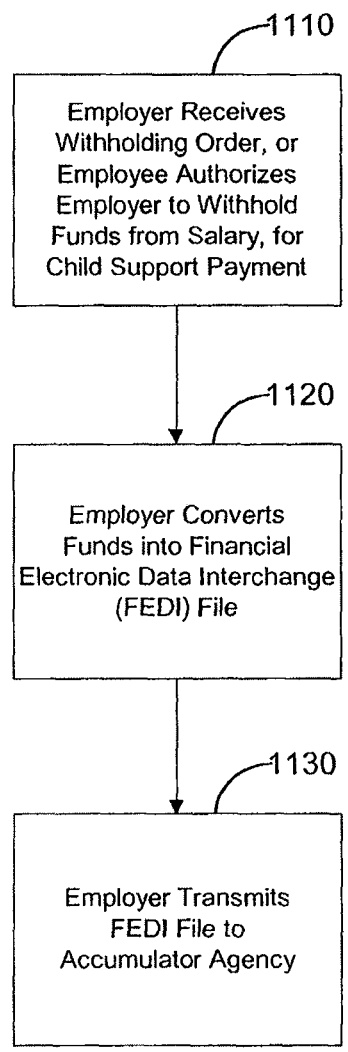
FIG. 11 is a flow diagram of a method for initiating a payment, in accordance with the embodiment of the invention, as shown in FIG. 10.
Figure 12:
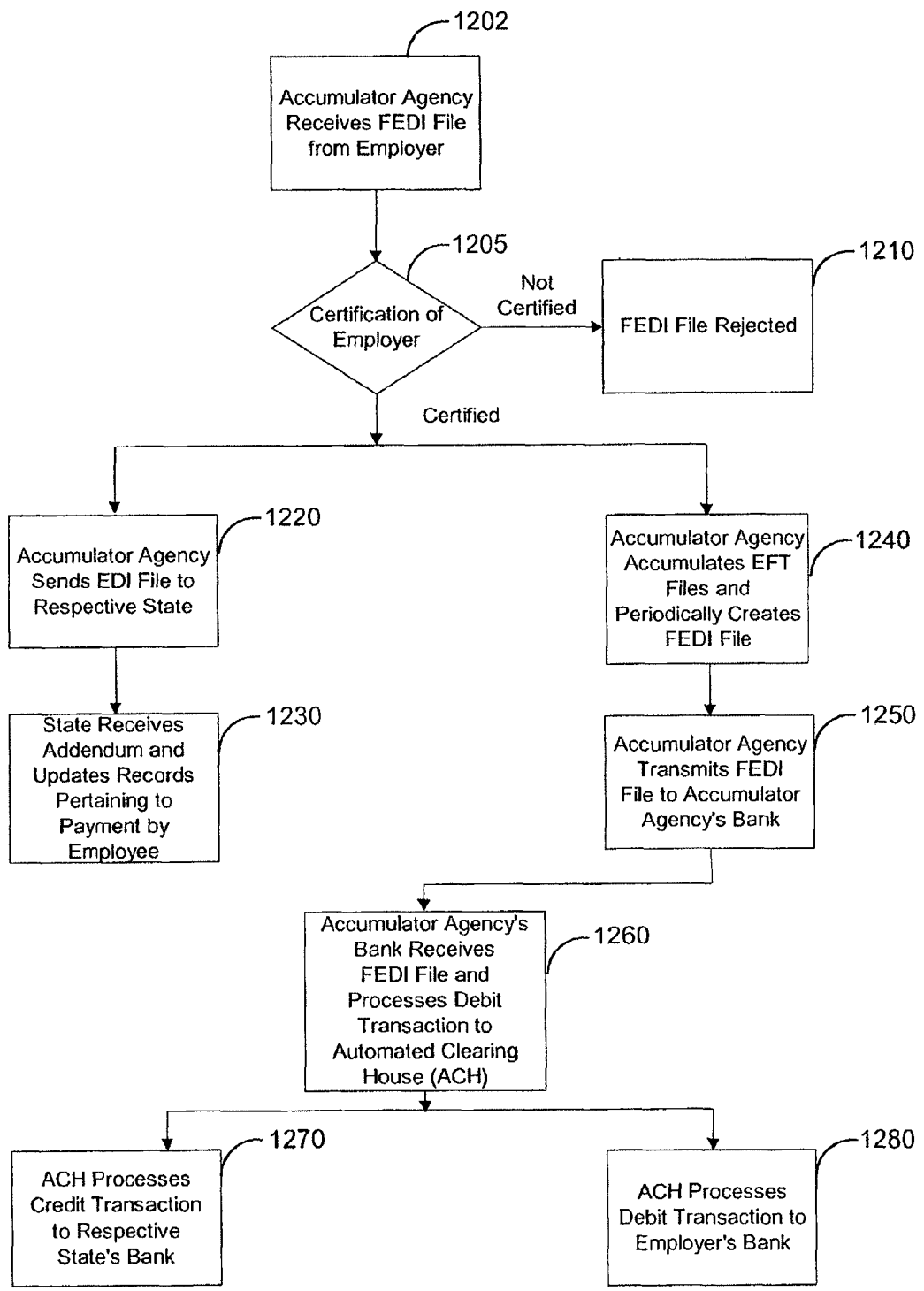
FIG. 12 is a flow diagram of a method for implementing payment processing, in accordance with the embodiment of the invention, as shown in FIG. 10.

In describing the processes consistent with the invention, various implementations of systems consistent with the invention are also described herein. For example, FIG. 10 illustrates a payment processing system consistent with the preferred embodiment of the invention as shown in FIG. 4. FIGS. 11 and 12 depict flow diagrams illustrating the series of steps performed by system 1000 as shown in FIG. 10. In initiating payment processing pursuant to the preferred embodiment, employer 410 (shown here as employers 412, 414, 416) receives a withholding order from initiator 110 (here, a non-custodial parent/employee), authorizing employer 410 to withhold funds from salary regarding a child support obligation (step 1110). If employer 410 receives a withholding order, the order will involve either a wage assignment income withholding or wage lien from a state agency or court ordering the withholding of funds from the salary of an employee pursuant to a child support obligation. Alternatively, an employee can also authorize an employer to withhold funds from his or her salary for a child support obligation. Whatever the form of authorization, once authorized, the employer converts the withholding obligation into a FEDI file (step 1120). This FEDI file may contain a payment with addendum information regarding disbursement in either the CCD or CTX formats. The FEDI file preferably is in the CTX format for greater efficiency and cost savings. Following the creation of the FEDI file, the employer then transmits the FEDI file to accumulator agency 130 (step 1130).

Once accumulator agency 130 receives the FEDI file from employer 410 (step 1202), accumulator agency 130 validates the FEDI transmission (step 1205). The validation of the FEDI transmission may include certification of the employer. In this certification process, accumulator agency 130 determines whether employer 410, which transmitted the FEDI file, is registered with accumulator agency 130. If employer 410 is not registered with accumulator agency 130, the FEDI file is rejected (step 1210). If employer 410 is registered with accumulator agency 130, employer 410 is certified and processing of the FEDI file continues. Note that this certification step is only one of many possible certification steps pursuant to methods consistent with the invention. Other certification steps may include, for example, validation of the data contained within the FEDI file.

Following certification of the employer, accumulator agency 130 initiates two transmissions. On the one hand, accumulator agency 130 sends an EDI file to state 460 (shown here as state A 462, state B 464, and state C 466) (step 1220). This EDI file indicates to state 460 that a payment has been made by initiator 110 (or, an employee) via employer 410. Once state 460 receives the EDI file, state 460 uses the information contained within the addendum and updates its records pertaining to the payment by the employee (step 1230). On the other hand, accumulator agency 130 also periodically accumulates EFT files for subsequent transmission (step 1240). Accumulator agency 130 preferably transmits EFT files by the use of a FEDI file. For example, using the CTX format, accumulator agency 130 can accumulate 9,999 EFT payment transactions for transmissions in a single FEDI file. Once accumulator agency 130 has created such a FEDI file, the file is transmitted to accumulator agency's bank 210 (step 1250).

Upon receipt of the FEDI file from accumulator agency 130, accumulator agency's bank 210 processes the payment transactions (step 1260). If accumulator agency 130 transmitted a FEDI file, accumulator agency's bank 210 segregates and processes the payments, but if accumulator agency 130 transmitted a single EFT file, then accumulator agency's bank 210 simply processes the single payment transaction. Once accumulator agency's bank 210 has accumulated and processed the payment transactions received from accumulator agency 130, accumulator agency's bank 210 then interacts with ACH 220. As done by accumulator agency 130, accumulator agency's bank 210 may also utilize FEDI when transacting with ACH 220. Thus, accumulator agency's bank may periodically accumulate and transmit payment transactions in the form of a FEDI file in the CTX format to ACH 220

Once ACH 220 receives the payment transaction information from accumulator agency's bank 210, ACH 220 processes the payments as debit-based transactions. Accordingly, ACH 220 processes the payments as debit-based transactions by transmitting a debit transaction to employer's bank 440 (step 1280) and transmitting a credit transaction to state bank 470 (step 1270), such as, state A's bank 472, state B's bank 474, and state C's bank 476. Following the processing of these transactions by ACH 220, the payment obligation from employer's bank 440 is satisfied with regard to state 460, for example, including state 463, state 464 and state 466.

Figure 13:
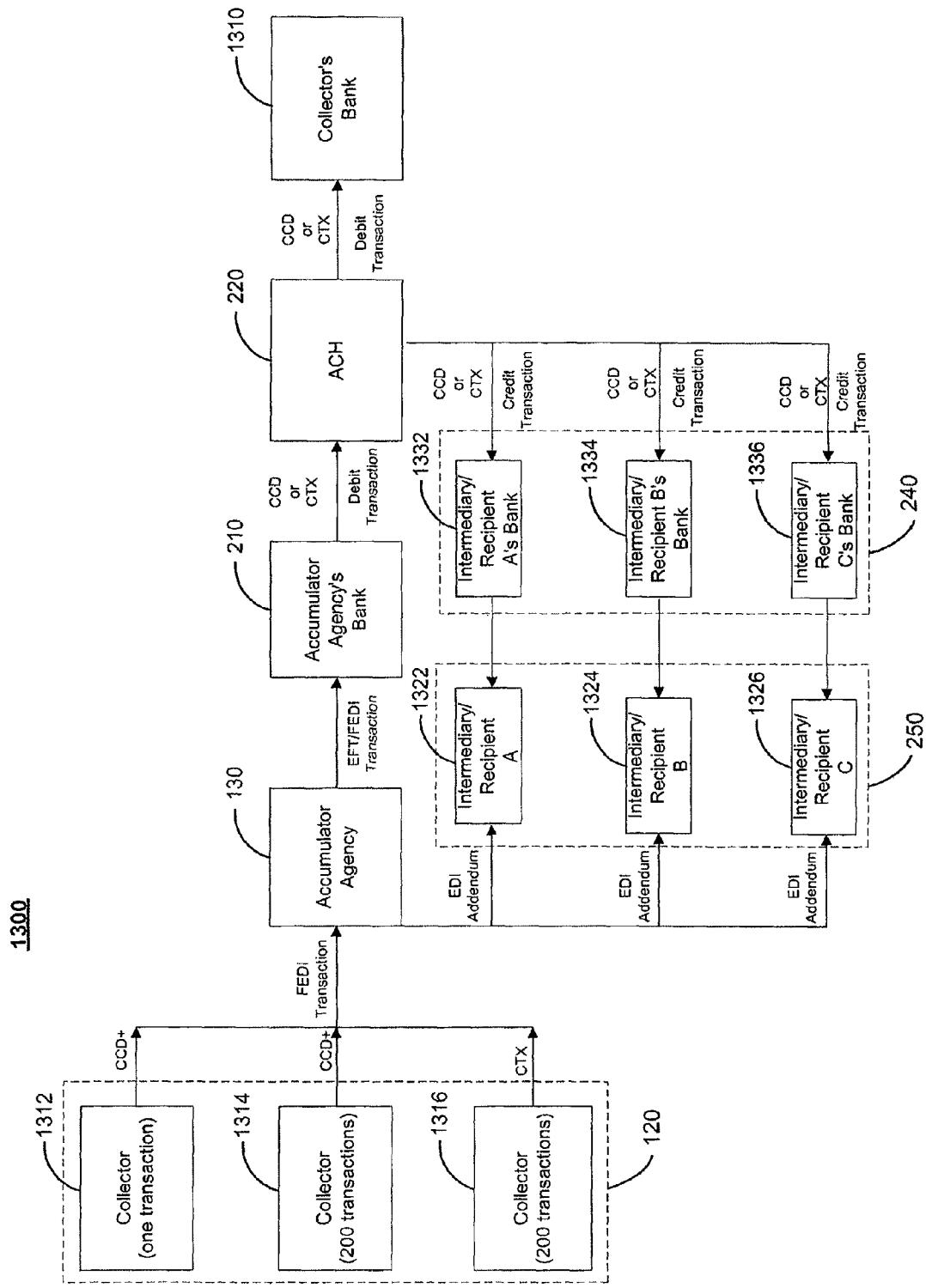
FIG. 13 is a block diagram of a payment processing system, in accordance with an alternative embodiment of the present invention, as shown in FIG. 2.
Figure 14:
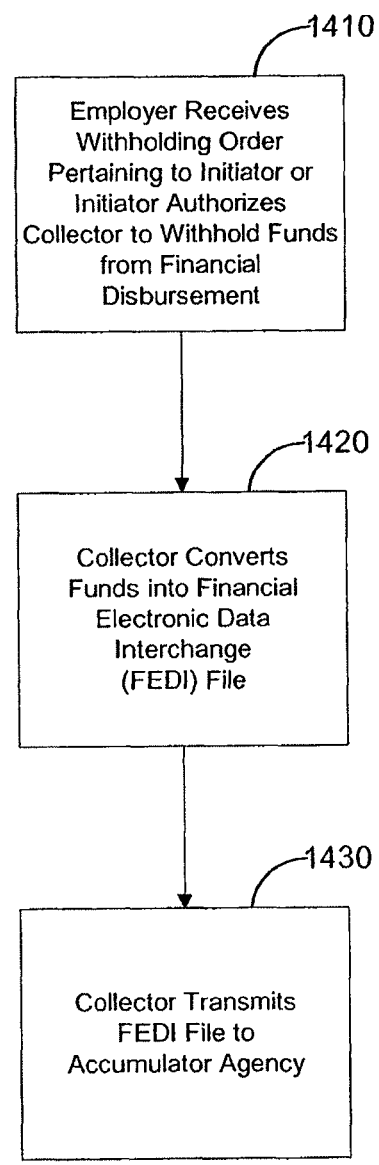
FIG. 14 is a flow diagram for a method for initiating a payment, in accordance with the embodiment of the invention, as shown in FIG. 13.
Figure 15:
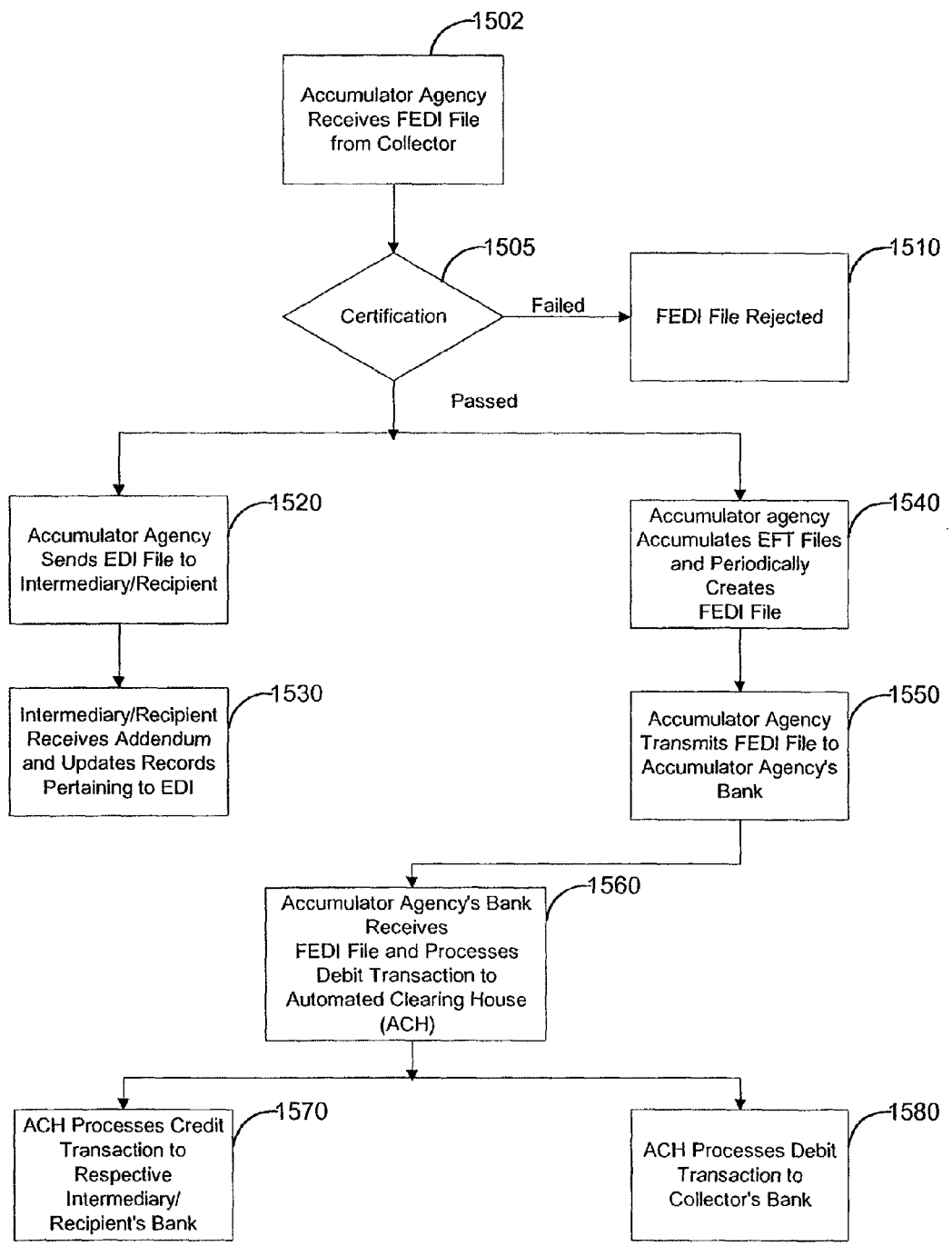
FIG. 15 is a flow diagram for a method for implementing payment processing, in accordance with the embodiment of the invention, as shown in FIG. 13.

Although the system and processes described by FIGS. 10-12 describe the preferred embodiment for the payment processing system shown in FIG. 4, other implementations are also available. FIG. 13, for example, illustrates an alternative embodiment for a payment processing system consistent with the invention. FIGS. 14-15 depict flow diagrams illustrating the series of steps performed by system 1300 as shown in FIG. 13. Similar to system 1000 in FIG. 10 and the processes described in FIGS. 11-12, system 1300 allows collectors 120 (shown here as collector 1312, collector 1314, and collector 1316) to transmit payment information to accumulator agency 130 in alternative methods (step 1410). In contrast to the system and methods described in FIGS. 10-12, the system and methods consistent with this embodiment do not limit collector 120 to an employer. Otherwise, system 1300 and the associated methods operate similarly as system 1000 and its associated methods. Collectors 120 create a FEDI file (step 1420) and transmit the FEDI file to accumulator agency 130 (step 1430). Accumulator agency 130 then receives the FEDI file from collectors 120 (step 1502) and performs certification (step 1505).

If certification fails, the FEDI file is rejected (step 1510). If certification passes, accumulator agency 130 performs two steps. First, accumulator agency 130 sends an EDI file to intermediary/recipient 250 (step 1520). Upon receipt of the EDI file, intermediary/recipient 250 updates its records regarding the payment described in the EDI file (step 1530). In contrast to the system and methods described in FIGS. 10-12, the system and methods consistent with this embodiment do not limit intermediary/recipient 250 to a state. However, to show that payment transaction can be processed to multiple recipients, system 1300 distinguishes intermediary/ recipients 1322, 1324, 1326. Second, accumulator agency accumulates EFT files from the FEDI files received from collectors 120 and periodically creates combined FEDI files for later transmission (step 1540). Accumulator agency 130 then transmits the FEDI file to accumulator agency's bank 210 (step 1550). Accumulator agency's bank 220 then receives the FEDI file from accumulator agency 130 and processes the payment as a debit-based transaction via ACH 220 (step 1560). ACH 220 subsequently performs two transactions: ACH 220 processes a debit transaction to collector's bank 1310 (step 1580) and transmits a credit transaction to intermediary/recipient's bank 240, here designated as intermediary/recipient A's bank 1332, intermediary/recipient B's bank 1334, and intermediary/recipient C's bank 1336 (step 1570). Following these transactions, the payment obligation from intermediary/recipient's bank 240 is satisfied with regard to intermediary/recipient 250, for example, including intermediary/recipient A 1322, intermediary/recipient B 1324, and intermediary/recipient C 1326.

As described above, the system and methods associated with FIGS. 13-15 provide for a more dynamic payment processing system than the system and methods associated with FIGS. 10-12. The system and methods consistent herewith allow for payment processing of mandatory as well as permissive obligations. Also, the system and methods consistent herewith allow for payment processing from entities other than non-custodial parents, through entities other than states, and to entities other than custodial parents.

Figure 16:
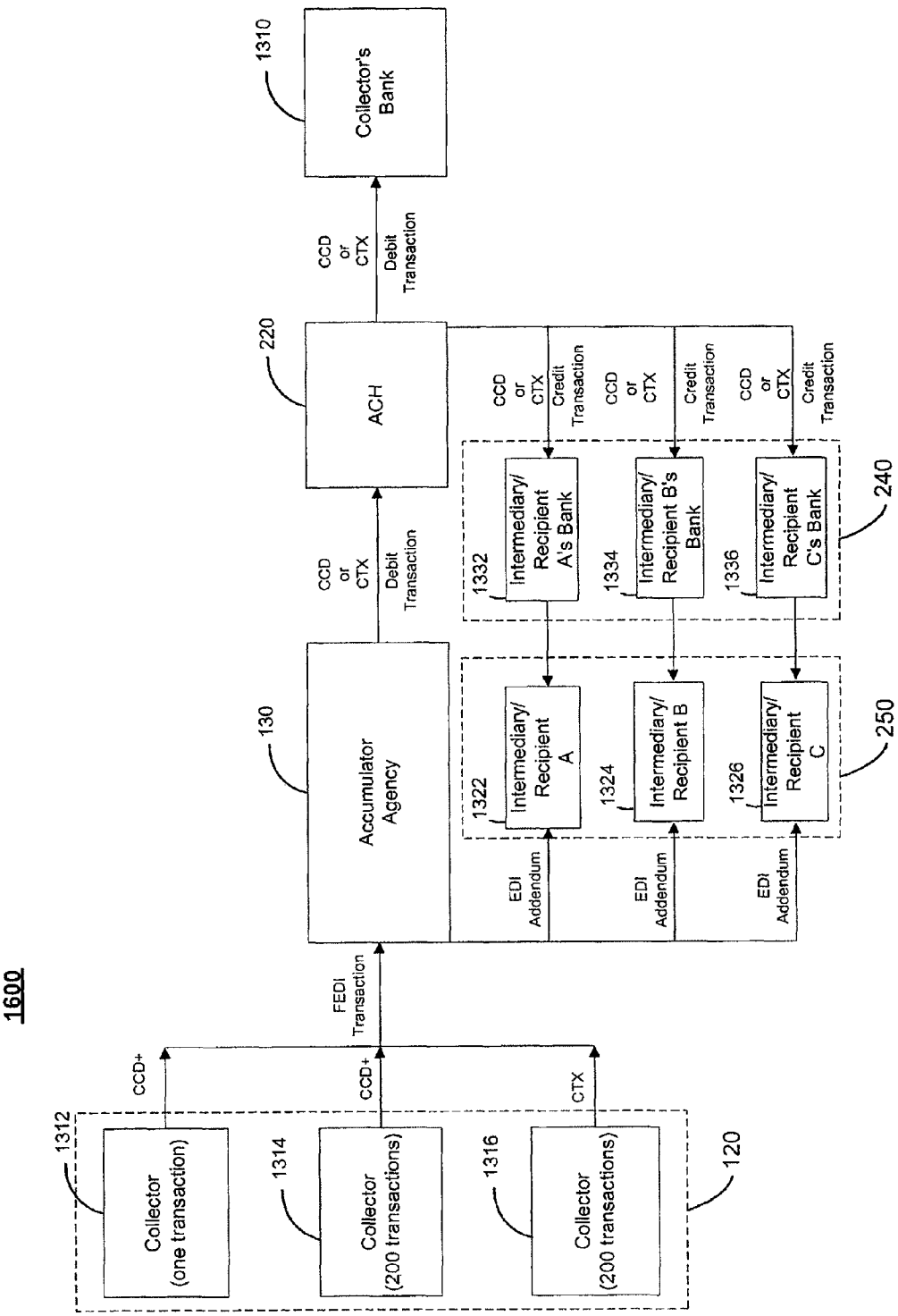
FIG. 16 is a block diagram for a payment processing system, in accordance with another alternative embodiment of the present invention, as shown in FIG. 2.

FIG. 16 illustrates another alternative embodiment for a payment processing system consistent with the invention. Similar to system 1300, described in FIG. 13, system 1600 operates in the same manner as the system and methods disclosed in FIGS. 13-15, except system 1600 allows accumulator agency 130 to transact directly with ACH 220. In short, system 1600 allows accumulator agency 130 to function as a bank.

In system 1600, collectors 120 (here shown as collector 1312, collector 1314, and collector 1316) transmits payment information to accumulator agency 130. Once accumulator agency 130 receives the FEDI file from collectors 120, following certification, accumulator agency 130 then sends an EDI file to intermediary/recipient 250, and accumulator agency 130 sends an FEDI file to a ACH 220. Notably, in contrast to the system and methods described by FIGS. 10-15, the system and methods consistent with FIG. 16 allow accumulator agency 130 to transact directly with ACH 220. In this manner, accumulator agency 130 functions as a bank. Following the transactions between ACH 220 and accumulator agency 130, ACH 220 processes the payments as debit-based transactions. In so doing, ACH 220 processes a debit transaction to collector's bank 1310 and transmits a credit transaction to intermediary/recipient's bank 240. Like the system and methods consistent with the embodiment of the invention associated with FIGS. 13-15, the system and methods consistent with FIG. 16 also provide for a more dynamic payment processing system. By allowing accumulator agency 130 to transact directly with ACH 220, transaction steps are omitted that allow for a more efficient and thus timely processing of payments. Of course, the omission of this one step includes but one of many changes that can be made to the systems and methods for payment processing consistent with the invention.

Figure 17:
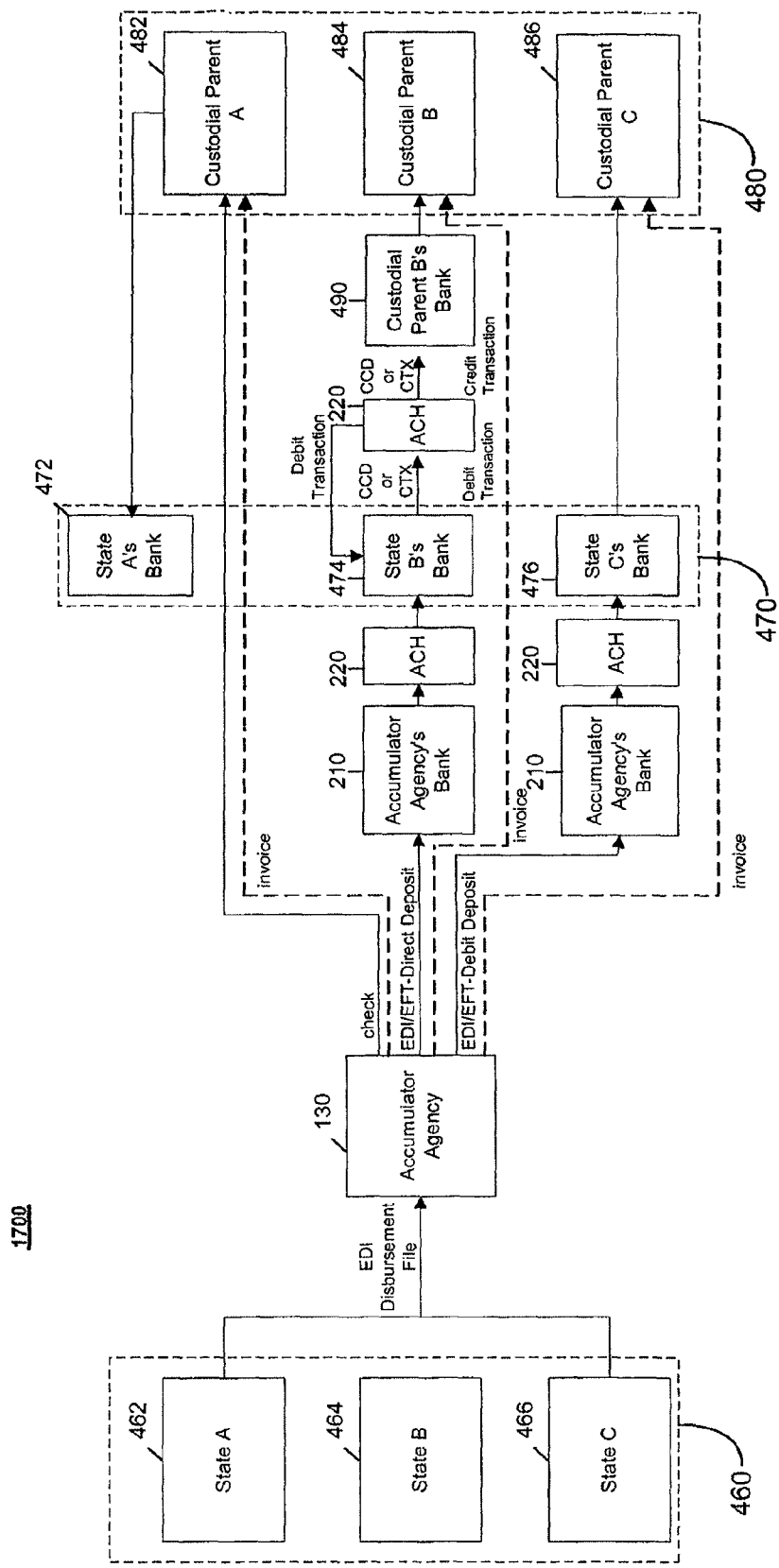
FIG. 17 is a block diagram for a disbursement processing system, in accordance with the preferred embodiment of the present invention, as shown in FIG. 4.
Figure 18:
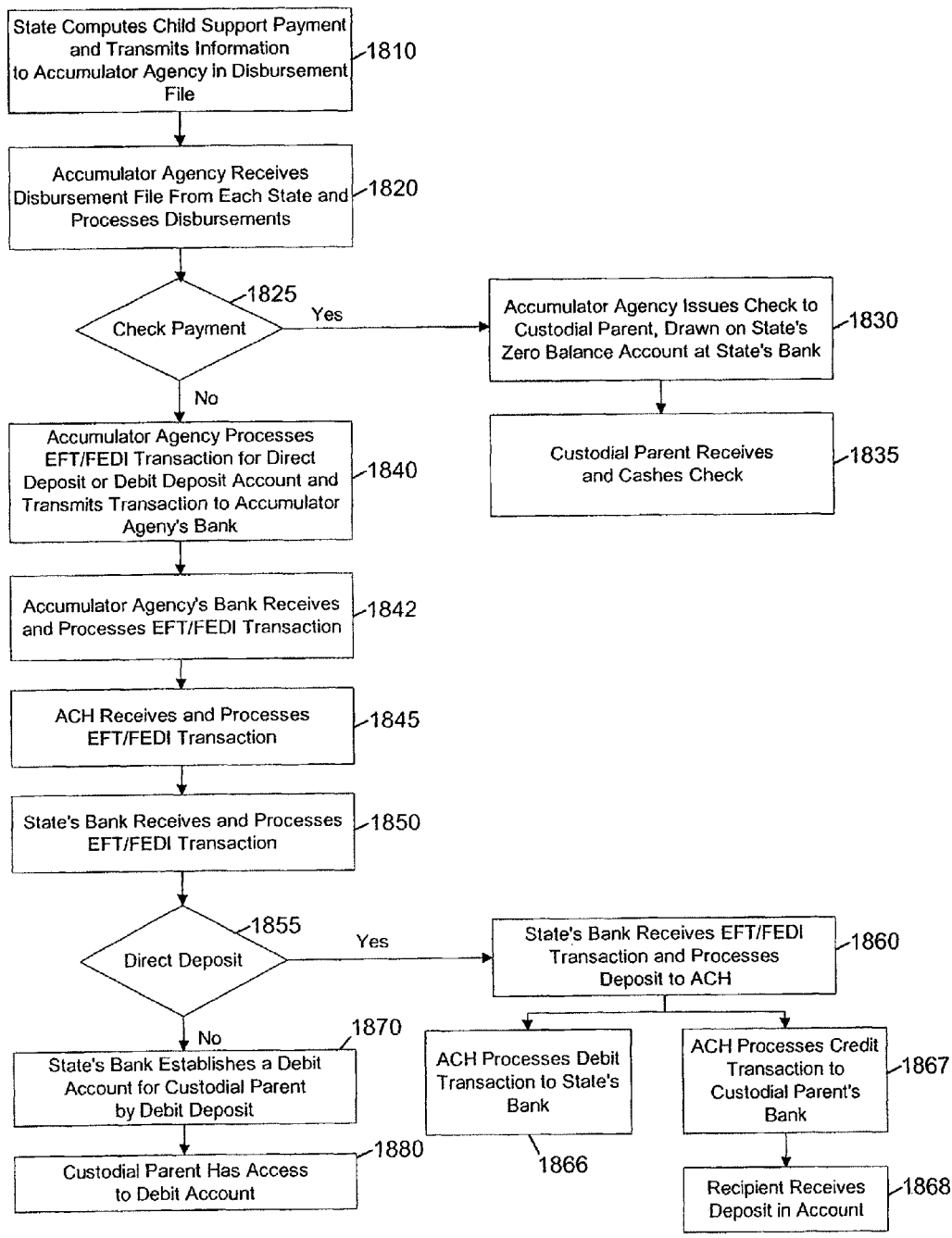
FIG. 18 is a flow diagram of a method for disbursement processing, in accordance with the embodiment of the invention shown in FIG. 17.

FIG. 17 illustrates a disbursement processing system consistent with the preferred embodiment of the invention as shown in FIG. 4. FIG. 18 depicts a flow diagram illustrating the series of steps performed by system 1700 as shown in FIG. 17. In transacting disbursement processing pursuant to the preferred embodiment, state 460 (here shown as state A 462, state B 464, and state C 466) computes the child support disbursement due to recipient 330 and transmits the disbursement information in an EDI file to accumulator agency 130 (step 1810). Accumulator agency 130 receives the EDI file from state 460 and processes the disbursement (step 1820). If the disbursement is a check (step 1825), accumulator agency 130 prints the check and transmits it directly to custodial parent 480 (step 1830). In system 1700, the issuance of a check by accumulator agency 130 is transmitted to custodial parent A 482. The issued check is drawn on the bank account of state 460. In system 1700, the check issued by accumulator agency 130 to custodial parent A 482 is drawn on state A's bank 472 (step 1835).

If the disbursement is not a check, accumulator agency 130 must process an electronic transaction for the disbursement (step 1840). To do so, accumulator agency 130 issues an EFT/FEDI transaction to accumulator agency's bank 210 (step 1842) and accumulator agency's bank then transmits the transaction to ACH 220 (step 1845). ACH 220 then transmits the EFT/FEDI transaction to state bank 470 (step 1850). If the EFT/FEDI transaction is for a direct deposit (step 1855), state bank 470 subsequently issues a direct deposit via ACH 220 (step 1860). In system 1700, the issuance of a direct deposit by accumulator agency 130 results in the transmission of a direct deposit to ACH 220. ACH 220 then processes the direct deposit to custodial parent B's bank 490. In so doing, ACH 220 issues a debit transaction to state B's bank 474 (step 1866) and issues a credit transaction to custodial parent B's bank 490 (step 1867). Thereby, custodial parent B 484 receives a disbursement in the form of a direct deposit (step 1868).

If disbursement is not by direct deposit, accumulator agency 130 processes the disbursement as a debit deposit (step 1870). In establishing a debit deposit, accumulator agency 130 has the option of where to locate the debit deposit account. In system 1700, accumulator agency 130 establishes the direct deposit account at state C's bank 476, by transmitting the debit deposit information via ACH 220. Thereby, custodial parent C 486 receives the disbursement in the form of a debit account at state C's bank 476 (step 1880). Alternatively, accumulator agency 130 can also establish a debit deposit account at accumulator agency's bank 210. Additionally, although not depicted in FIG. 18, the system and methods consistent with the preferred embodiment also contemplate the issuance of an invoice to custodial parent 480 for any disbursement (as indicated by the dotted line on FIG. 17).

Figure 19:
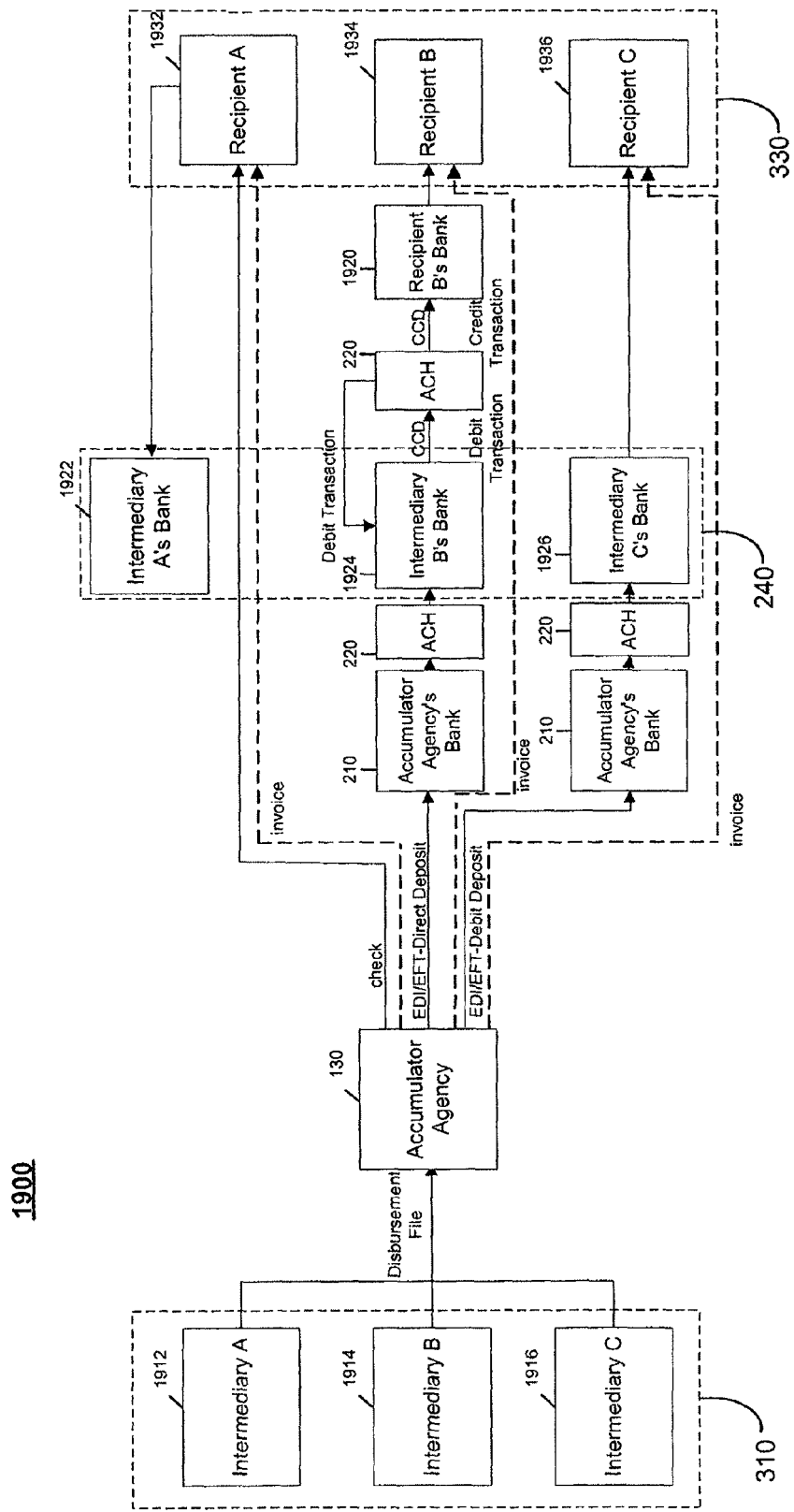
FIG. 19 is a block diagram of a disbursement processing system, in accordance with an alternative embodiment of the present invention, as shown in FIG. 3.
Figure 20:
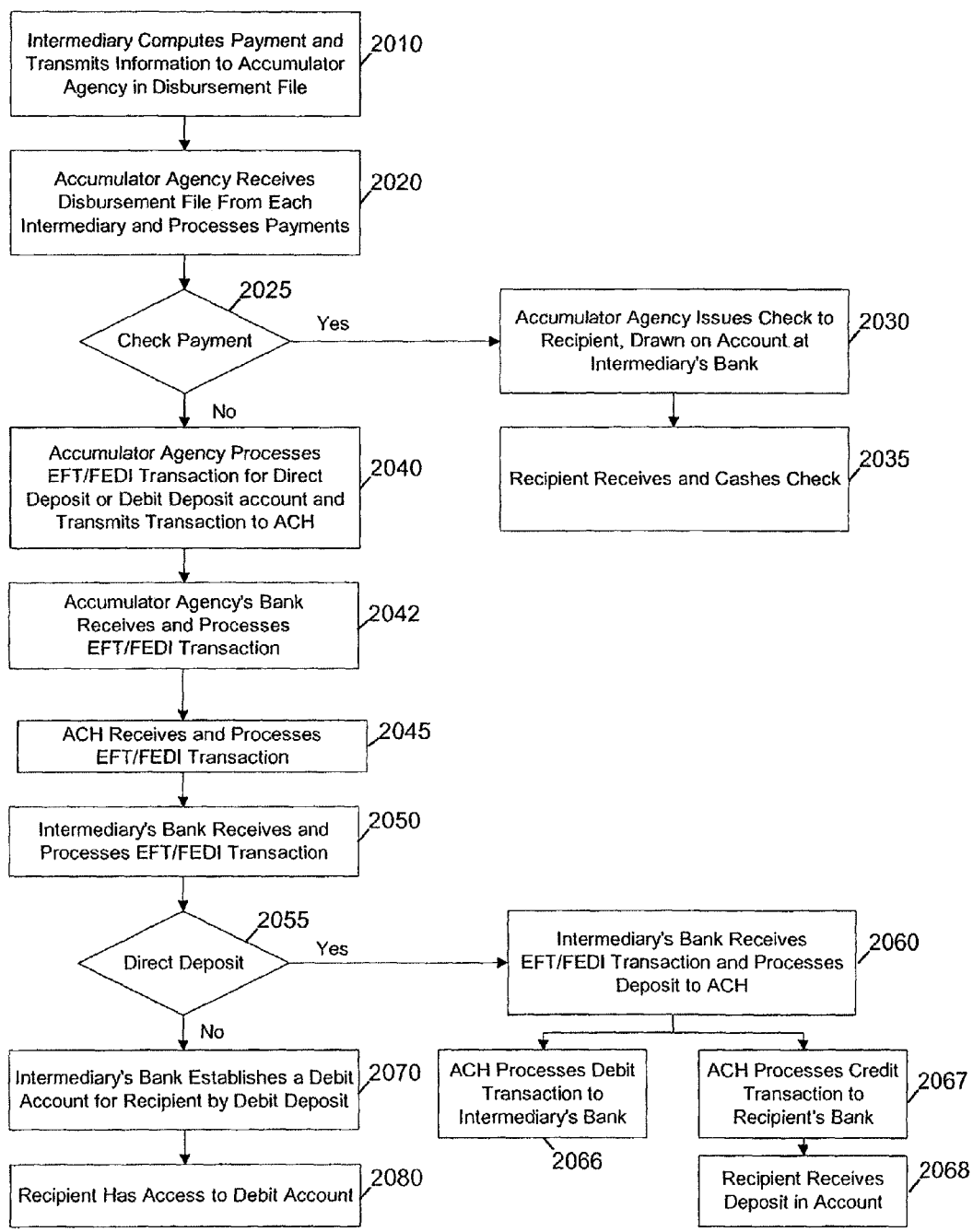
FIG. 20 is a flow diagram for a method of disbursement processing, in accordance with the embodiment of the invention shown in FIG. 19.

Although the system and processes described by FIGS. 17-18 describe the preferred embodiment for the disbursement processing system shown in FIG. 4, other implementations are also available. FIG. 19, for example, illustrates an alternative embodiment for a disbursement processing system consistent with the invention. FIG. 20 depicts a flow diagram illustrating the series of steps performed by system 1900 as shown in FIG. 19. Similar to system 1700 in FIG. 17 and the processes described in FIG. 18, system 1900 enables intermediary 310 to compute a payment due to recipient 330 and to transmit the disbursement information in an EDI file to accumulator agency 130 (step 2010). In contrast to the system and methods described in FIGS. 17-18, the system and methods consistent with this embodiment do not limit intermediary 310 to a state. Otherwise, system 1900 and the associated methods operate similarly as system 1700 and its associated methods. Accumulator agency 130 receives the EDI file from intermediary 310 and processes the disbursement (step 2020). If the disbursement is a check (step 2025), accumulator agency 130 prints the check and transmits it directly to recipient 330 (step 2030). Again, in contrast to the system and methods described in FIGS. 17-18, the system and methods consistent with this embodiment do not limit recipient 330 to a custodial parent. However, to show that multiple disbursement transaction can be processed to multiple recipients, system 1900 distinguishes recipient A 1932, recipient B 1934, and recipient C 1936. As indicated in system 1900, the issuance of a check by accumulator agency 130 is transmitted to recipient A 1932. The issued check is drawn on the bank account of intermediary A's bank 1912. In system 1900, the check issued by accumulator agency 130 recipient A 1932 is drawn on intermediary A's bank 1912 (step 2035).

If the disbursement is not a check, accumulator agency 130 must process an electronic transaction for the disbursement (step 2040). To do so, accumulator agency 130 issues an EFT/FEDI transaction to accumulator agency's bank 210 (step 2042) and accumulator agency's bank then transmits the transaction to ACH 220 (step 2045). ACH 220 then transmits the EFT/FEDI transaction to intermediary/recipient's bank 240 (step 2050). If the EFT/FEDI transaction is for direct deposit (step 2055), intermediary/recipient bank 240 subsequently issues a direct deposit via ACH 220 (step 2060). In system 1900, accumulator agency 130 issues a direct deposit to ACH 220, which results in the transmission of a direct deposit to intermediary B's bank 1914, which transacts with ACH 220 to process the direct deposit to recipient B's bank 1920. In so doing, ACH 220 issues a debit transaction to intermediary B's bank 1914 (step 2066) and issues a credit transaction to recipient B's bank 1920 (step 2067). Thereby, recipient B 1934 receives a disbursement in the form of a direct deposit (step 2068).

If disbursement is not by direct deposit, accumulator agency 130 processes the disbursement as a debit deposit (step 2070). Similar to the system and methods described in FIGS. 17-18, in establishing a debit deposit, accumulator agency 130 has the option of where to locate the debit account. In system 1900, accumulator agency 130 establishes the direct deposit account at intermediary C's bank 1916, by transmitting the direct deposit information via ACH 220. Thereby, recipient C 1936 receives the disbursement in the form of a debit account at intermediary C's bank 1916 (step 2080). Alternatively, accumulator agency 130 can establish a debit deposit account at other locations, including accumulator agency's bank 210. Finally, although not depicted in FIG. 20, the system and methods consistent with this embodiment also contemplate the issuance of an invoice to recipient 330 for any disbursement (as indicated by the dotted line on FIG. 19).

As described above, the system and methods associated with FIGS. 19-20 provide for a more dynamic disbursement processing system than the system and methods associated with FIGS. 17-18. The system and methods consistent herewith allow for disbursement processing for mandatory as well as permissive obligations. Also, the system and methods allow for disbursement processing from entities other than non-custodial parents, through entities other than states, and to entities other than custodial parents.

FIG. 21 illustrates another alternative embodiment for a disbursement processing system consistent with the invention. Similar to system 1900 described in FIG. 19, system 2100 operates in the same manner as the system and methods disclosed in FIGS. 19-20, except system 2100 allows accumulator agency 130 to transact directly with ACH 220. In short, system 2100 allows accumulator agency 130 to function as a bank.

In system 2100 intermediary 310 (here shown as intermediary A 1912, intermediary B 1914, and intermediary C 1916) computes the disbursement due to recipient 330 and transmits the disbursement information in an EDI file to accumulator 130. Accumulator agency 130 receives the EDI file from intermediary 310 and processes the disbursement. If the disbursement is a check, accumulator agency 130 issues the check consistent with the system and methods disclosed for system 1700 in FIGS. 19-20.

If the disbursement is not a check, accumulator agency 130 processes an electronic transaction for the disbursement by issuing an EFT/FEDI transaction directly to ACH 220. Notably, in contrast to the system and methods described by FIGS. 17-20, the system and methods consistent with FIG. 21 allow accumulator agency 130 to transact directly with ACH 220. In this manner accumulator agency 130 functions as a bank. If the EFT/FEDI transaction is for a direct deposit, accumulator agency 130 issues a direct deposit via ACH 220. In system 2100, accumulator agency 130 issues a direct deposit to ACH 220, and in so doing, issues a debit transaction to accumulator agency 130 and issues a credit transaction to recipient B's bank 1920. Thereby, recipient B 1934 receives a disbursement in the form of a direct deposit. Alternatively, if the disbursement is not by direct deposit, accumulator agency 130 processes the disbursement as a debit deposit. In establishing a debit deposit, accumulator agency 130 establishes a direct deposit account directly at accumulator agency 130. Thereby, accumulator agency 130 merely instructs recipient 1936 that a debit deposit account has been formed for its benefit. Although not depicted in FIG. 21, the system and methods consistent with this embodiment also contemplate the issuance of an invoice to recipient 330 for any disbursement (as indicated by the dotted line on FIG. 21).

Just as FIG. 16 describes a more dynamic payment processing system consistent with the invention by allowing accumulator agency 130 to function as a bank, the system and methods consistent with FIG. 21 enable the same advantages for a disbursement processing system. By allowing accumulator agency 130 to transact directly with ACH 220, transaction steps are omitted that allow for a more efficient and timely processing of disbursements. Of course, the omission of this one step includes but one of many changes that can be made to the systems and methods for disbursement processing consistent with the invention.

CONCLUSION

The systems consistent with the invention provide for more efficient and more economical methods for the processing of either or both payments and disbursements. The systems process payments using debit-based EFT and processes disbursements using addendum-based EDI. This improved payment and disbursement methodology provides many advantages over the current payment and disbursement technologies.

As described above, it will be apparent to those skilled in the art that various modifications and variations can be made in the processes of the present invention without departing from the spirit and scope of the invention. Thus, it is intended that the present invention cover the modifications and variations of this invention, provided they come within the scope of the appended claims and their equivalents. In this context, equivalents means each and every implementation for carrying out the functions recited in the claims, even if not explicitly described herein.

What is claimed is:

1. A computer-implemented method of processing disbursement information through a bank or an automated clearing house to a governmental state entity of the United States by an accumulator agency, wherein the accumulator agency, the bank or automated clearing house, and the governmental state entity are separate entities, comprising the steps of:
   receiving instructions at the accumulator agency, using a computer processor, from the governmental state entity regarding the processing of disbursement information;
   receiving disbursement information at the accumulator agency, using the computer processor, the disbursement information including at least a disbursement transaction; and
   processing the disbursement transaction from the disbursement information by the accumulator agency, using the computer processor, to a disbursement recipient according to the received instructions.

2. The method of claim 1, wherein receiving instructions regarding the processing of disbursement information further comprises receiving an electronic file from the governmental state entity with the disbursement information instructions.

3. The method of claim 1, wherein the governmental state entity is a state.

4. The method of claim 1, wherein the governmental state entity is a state disbursement unit.

5. The method of claim 1, wherein receiving disbursement information further comprises receiving disbursement information from a collector.

6. The method of claim 5, wherein the collector is an employer.

7. The method of claim 1, wherein the disbursement information is regarding a child support obligation.

8. The method of claim 7, wherein the child support obligation is regarding a child support payment owed by a noncustodial parent.

9. The method of claim 1, wherein processing the disbursement transaction further comprises processing a disbursement as the disbursement transaction via the bank.

10. The method of claim 1, wherein processing the disbursement transaction further comprises processing a disbursement as the disbursement transaction via the automated clearing house.

11. The method of claim 1, wherein processing the disbursement transaction further comprises establishing a disbursement as the disbursement transaction for the disbursement recipient.

12. The method of claim 1, wherein establishing a disbursement as the disbursement transaction further comprises sending a check as the disbursement from the accumulator agency to the disbursement recipient.

13. The method of claim 11, wherein establishing a disbursement as the disbursement transaction further comprises establishing an electronic account as the disbursement from the accumulator agency to the disbursement recipient.

14. The method of claim 13, wherein establishing an electronic account further comprises sending the disbursement by the accumulator agency to a direct deposit account at a disbursement recipient's bank for the disbursement recipient.

15. The method of claim 13, wherein establishing an electronic account further comprises establishing a debit deposit account by the accumulator agency at a an accumulator agency's bank for the disbursement recipient.

16. The method of claim 13, wherein establishing an electronic account further comprises establishing a debit deposit account by the accumulator agency at the accumulator agency for the disbursement recipient.

17. The method of claim 11, wherein establishing a disbursement as the disbursement transaction further comprises processing an invoice to the disbursement recipient regarding the disbursement.

18. The method of claim 11, wherein the disbursement recipient is a noncustodial parent.

19. The method of claim 11, wherein the disbursement recipient is a state.

20. A system of processing disbursement information through a bank or an automated clearing house to a government state entity of the United States by an accumulator agency, wherein the accumulator agency, the bank of automated clearing house, and the governmental state entity are separate entities, comprising:
   a receiving instructions hardware component configured to receive instructions at the accumulator agency from the governmental state entity regarding the processing of disbursement information;
   a receiving disbursement information hardware component configured to receive disbursement information at the accumulator agency, the disbursement information including at least a disbursement transaction; and
   a processing hardware component configured to process the disbursement transaction from the disbursement information by the accumulator agency to a disbursement recipient according to the received instructions.

21. The system of claim 20, wherein the receiving instructions hardware component is further configured to receive an electronic file from the governmental state entity with the disbursement information instructions.

22. The system of claim 20, wherein the governmental state entity is a state.

23. The system of claim 20, wherein the governmental state entity is a state disbursement unit.

24. The system of claim 20, wherein the receiving disbursement information hardware component is further configured to receive disbursement information from a collector.

25. The system of claim 24, wherein the collector is an employer.

26. The system of claim 20, wherein the disbursement information is regarding a child support obligation.

27. The system of claim 26, wherein the child support obligation is regarding a child support payment owed by a noncustodial parent.

28. The system of claim 20, wherein the processing hardware component is further configured to process a disbursement as the disbursement transaction via a bank.

29. The system of claim 20, wherein the processing hardware component is further configured to process a disbursement as the disbursement transaction via an automated clearing house.

30. The system of claim 20, wherein the processing hardware component is further configured to establish a disbursement as the disbursement transaction for the disbursement recipient.

31. The system of claim 30, wherein the processing hardware component is further configured to send a check as the disbursement from the accumulator agency to the disbursement recipient.

32. The system of claim 30, wherein the processing hardware component is further configured to establish an electronic account as the disbursement from the accumulator agency to the disbursement recipient.

33. The system of claim 32, wherein the processing hardware component is further configured to send the disbursement by the accumulator agency to a direct deposit account at a disbursement recipient's bank for the disbursement recipient.

34. The system of claim 32, wherein the processing hardware component is further configured to establish a debit deposit account at a an accumulator agency's bank for the disbursement recipient.

35. The system of claim 32, wherein processing hardware component is further configured to establish a debit deposit account at the accumulator agency for the disbursement recipient.

36. The system of claim 30, wherein the processing hardware component is further configured to process an invoice to the disbursement recipient regarding the disbursement.

37. The system of claim 30, wherein the disbursement recipient is a noncustodial parent.

38. The system of claim 30, wherein the disbursement recipient is a state.

39. A non-transitory computer readable medium containing instructions for controlling a computer system to perform a method of processing disbursement information through a bank or an automated clearing house to a governmental state entity of the United States by an accumulator agency, wherein the accumulator agency, the bank or automated clearing house, and the governmental state entity are separate entities, the method comprising:
 receiving instructions at the accumulator agency from the governmental state entity regarding the processing of disbursement information;
 receiving disbursement information at the accumulator agency, the disbursement information including at least a disbursement transaction; and
 processing the disbursement transaction from the disbursement information by the accumulator agency to a disbursement recipient according to the received instructions.

40. A system of processing disbursement information through a bank or an automated clearing house to a government state entity of the United States by an accumulator agency, wherein the accumulator agency, the bank of automated clearing house, and the governmental state entity are separate entities, comprising:
 receiving means for receiving instructions at the accumulator agency from the governmental state entity regarding the processing of disbursement information;
 receiving means for receiving disbursement information at the accumulator agency, the disbursement information including at least a disbursement transaction; and
 processing means for processing the disbursement transaction from the disbursement information by the accumulator agency to a disbursement recipient according to the received instructions.

* * * * *